(12) United States Patent
     Kojima

(10) Patent No.: US 12,543,941 B2
(45) Date of Patent: Feb. 10, 2026

(54) IMAGE PROCESSING APPARATUS AND IMAGE PROCESSING METHOD

(71) Applicant: Sony Olympus Medical Solutions Inc., Tokyo (JP)

(72) Inventor: Koji Kojima, Tokyo (JP)

(73) Assignee: Sony Olympus Medical Solutions Inc., Tokyo (JP)

( * ) Notice: Subject to any disclaimer, the term of this patent is extended or adjusted under 35 U.S.C. 154(b) by 431 days.

(21) Appl. No.: 18/156,401

(22) Filed: Jan. 19, 2023

(65) Prior Publication Data

US 2023/0255460 A1    Aug. 17, 2023

(30) Foreign Application Priority Data

Feb. 16, 2022 (JP) ................................. 2022-022493

(51) Int. Cl.
    *A61B 1/04*     (2006.01)
    *A61B 1/00*     (2006.01)
    *A61B 1/06*     (2006.01)
    *H04N 23/56*     (2023.01)
    *H04N 23/74*     (2023.01)
    *A61B 5/00*     (2006.01)

(52) U.S. Cl.
    CPC ........ *A61B 1/043* (2013.01); *A61B 1/000095* (2022.02); *A61B 1/0004* (2022.02); *A61B 1/0638* (2013.01); *H04N 23/56* (2023.01); *H04N 23/74* (2023.01); *A61B 5/0071* (2013.01)

(58) Field of Classification Search
     USPC ....................................................... 382/128
     See application file for complete search history.

(56) References Cited

U.S. PATENT DOCUMENTS

| | | | | |
|---|---|---|---|---|
| 2015/0139527 | A1* | 5/2015 | Ikenaga | G02B 21/365 382/133 |
| 2018/0228352 | A1* | 8/2018 | Kojima | A61B 1/0638 |
| 2019/0110686 | A1* | 4/2019 | Kato | A61B 1/043 |
| 2020/0286226 | A1* | 9/2020 | Michihata | A61B 1/043 |
| 2020/0337540 | A1* | 10/2020 | Takekoshi | G02B 7/36 |

FOREIGN PATENT DOCUMENTS

| | | | |
|---|---|---|---|
| JP | H10309282 | A | 11/1998 |
| JP | 2008142180 | A | 6/2008 |
| JP | 2009279168 | A | 12/2009 |
| JP | 5184016 | B2 | 4/2013 |
| JP | 2013183911 | A | 9/2013 |
| JP | 2021003347 | A | 1/2021 |
| WO | WO-2012169270 | A1 | 12/2012 |
| WO | WO-2017073302 | A1 | 5/2017 |

* cited by examiner

*Primary Examiner* — Mark R Milia
(74) *Attorney, Agent, or Firm* — XSENSUS LLP

(57) ABSTRACT

An image processing apparatus includes, among other things, a control unit that adjusts luminance of a first image and luminance of a second image by adjusting a first control parameter for controlling at least one of a first light source, a first imaging unit, or a first image processing unit and a second control parameter for controlling at least one of a second light source, a second imaging unit, or a second image processing unit on the basis of luminance information of the superimposed image.

22 Claims, 10 Drawing Sheets

IMAGE PROCESSING APPARATUS AND IMAGE PROCESSING METHOD

This application claims the benefit of Japanese Priority Patent Application JP 2022-022493 filed on Feb. 16, 2022, the entire contents of which are incorporated herein by reference.

TECHNICAL FIELD

The present disclosure relates to an image processing apparatus and an image processing method.

BACKGROUND ART

There is known a medical image processing apparatus that acquires two types of captured images from an observation target and generates a superimposed image for observation by superimposing corresponding pixels. One of the two types of captured images is an image (referred to as a white image) in which an observation target is irradiated with white light and light reflected by the observation target is captured by an imaging element. The other type of captured image is an image (referred to as an infrared image) in which the observation target is irradiated with excitation light such as near infrared rays and fluorescence excited from the phosphor included in the observation target by the excitation light is captured by the imaging element.

In a method of observing an observation target on the basis of such a superimposed image, PTL 1 below describes a method of obtaining a composite balance between a white image and an infrared image by changing the light amounts of a white light source (white light source) and a near-infrared light source (near-infrared light source) or a gain of image processing. However, in this method, before the phosphor is injected into the observation target, the light amount of the near-infrared light source or the gain of the image processing is excessively increased. Therefore, there is a problem that the infrared image becomes too bright and noise in the superimposed image increases.

PTL 1 also describes a method of adjusting the luminance of near-infrared light emitted from a near-infrared light source following the luminance of a white image. In this method, before the phosphor is injected, the light amount of the near-infrared light source or the gain of the image processing is not excessively increased, and the infrared image is not excessively bright. However, when the amount of excited fluorescence increases, the brightness of the infrared image is not appropriately reflected in the superimposed image, and there is a problem that the superimposed image becomes excessively bright.

CITATION LIST

Patent Literature

PTL 1

JP 5184016 B2

SUMMARY

Technical Problem

According to an embodiment of the present disclosure, there are provided an image processing apparatus and an image processing method capable of superimposing a plurality of images obtained by imaging using a plurality of light sources in a suitable balance.

Solution to Problem

An image processing apparatus according to the present disclosure includes: a first light source that irradiates a subject with first light having a first wavelength band; a first imaging unit that generates a first image signal by exposing light reflected from the subject to the first light; a first image processing unit that performs first image processing on the basis of the first image signal to generate a first image; a second light source that irradiates the subject with second light having a second wavelength band different from the first wavelength band and including an excitation wavelength of a fluorescent substance contained in the subject; a second imaging unit that generates a second image signal by exposing fluorescence generated from the subject to the second light; a second image processing unit that performs second image processing on the basis of the second image signal to generate a second image; a superimposed image generation unit that generates a superimposed image by superimposing the first image and the second image; and a control unit that adjusts luminance of the first image and luminance of the second image by adjusting a first control parameter for controlling at least one of the first light source, the first imaging unit, or the first image processing unit and a second control parameter for controlling at least one of the second light source, the second imaging unit, or the second image processing unit on the basis of luminance information of the superimposed image.

DESCRIPTION OF EMBODIMENTS

Figure 1:
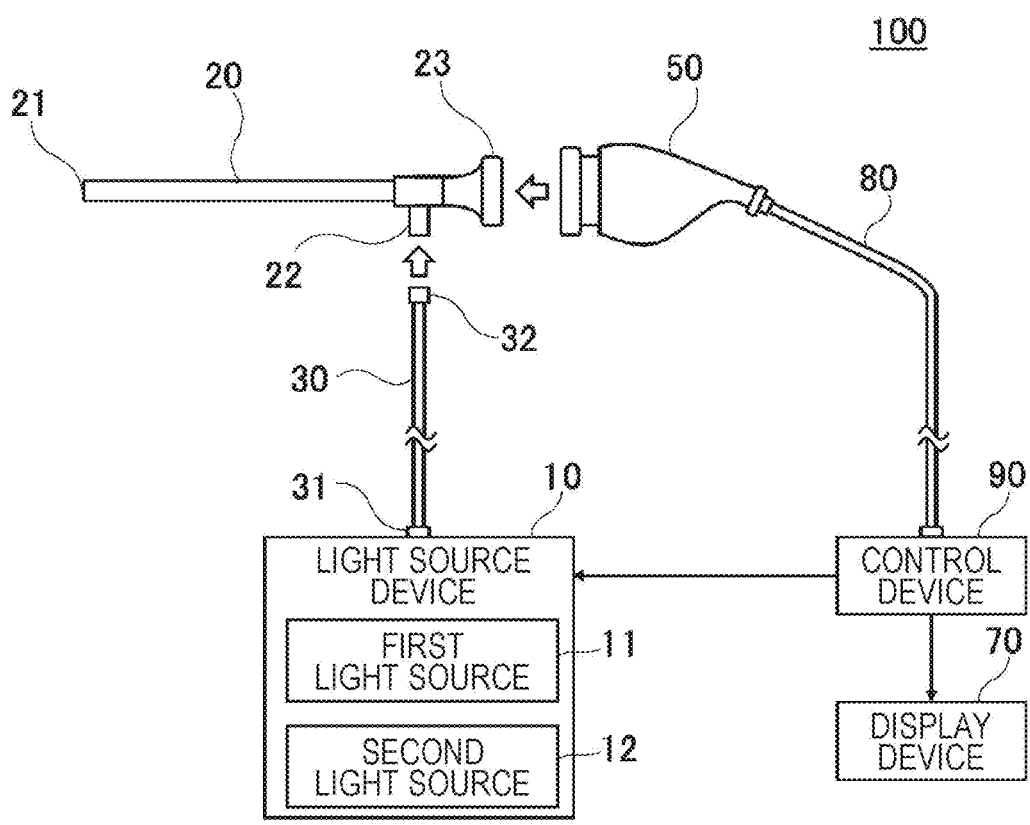
FIG. 1 is a diagram illustrating a configuration of an endoscope device according to the first embodiment of the present disclosure.

Hereinafter, embodiments of the present disclosure will be described with reference to the drawings. In the drawings, the same or corresponding elements are denoted by the same reference numerals, and detailed description thereof is omitted as appropriate.

First Embodiment

FIG. 1 is a diagram illustrating a configuration of an endoscope device 100 according to a first embodiment of the present disclosure. The endoscope device 100 is used in the medical field and is a device for imaging or observing the inside of a living body (observation target) to be a subject. The endoscope device 100 includes a light source device 10, an insertion member (endoscope main body) 20, a light guide 30, a camera head 50, a display device 70, a transmission cable 80, and a control device 90.

The light source device 10 generates light for irradiating the inside of the living body. The light source device 10 is connected to the insertion member 20 by the light guide 30. The light source device 10 is connected to the insertion member 20 by the light guide 30. The light source device 10 is detachably connected to one end 31 of the light guide 30, and supplies the generated light to the one end 31 of the light guide 30. The other end 32 of the light guide 30 is detachably connected to a connecting portion 22 of the insertion member 20.

The light source device 10 includes a first light source 11 and a second light source 12. The first light source 11 emits light in a first wavelength band. In the present embodiment, the first light source 11 emits white light (normal light) as the first wavelength band. As an example, the first light source 11 includes a light emitting diode (LED). The emission luminance (light amount) of the first light source 11 can be adjusted by a control unit 94. The light amount of the first light source 11 corresponds to an example of a first control parameter or a first light amount adjustment parameter for adjusting the luminance of an image (normal light image) captured on the basis of white light (normal light). The emission color of the first light source 11 is not limited to white. For example, the first light source 11 can emit light of other colors such as purple. In this case, for example, the color to be emitted can be changed by changing the mixing ratio of the RGB colors of the first light source 11.

The second light source 12 emits excitation light of a second wavelength band different from the first wavelength band. In the present embodiment, the second light source 12 emits near-infrared excitation light (excitation light) in a near-infrared wavelength band as the second wavelength band. As an example, the second light source 12 includes a semiconductor laser. In the present embodiment, the second light source 12 includes a semiconductor laser that emits near-infrared excitation light in a near-infrared wavelength band. The emission luminance (light amount) of the second light source 12 can be adjusted by the control unit 94.

The near-infrared excitation light emitted by the second light source 12 is excitation light that excites a fluorescent substance (phosphor) such as indocyanine green. When excited by the near-infrared excitation light, the fluorescent substance such as indocyanine green emits fluorescence having a central wavelength on a longer wavelength side than a central wavelength of a wavelength band of the near-infrared excitation light.

The wavelength band of the near-infrared excitation light and the wavelength band of the fluorescence may be set so as to partially overlap each other, or may be set so as not to overlap each other at all. The light amount of the second light source 12 corresponds to an example of a second control parameter or a second light amount adjustment parameter for adjusting the luminance of an image (fluorescence image) captured on the basis of fluorescence.

The light source device 10 causes the first light source 11 to emit light in a first period of the alternately repeated first period and second period under the control of the control device 90. That is, in the first period, the light source device 10 emits normal light (white light). Furthermore, the light source device 10 causes the second light source 12 to emit light in the second period under the control of the control device 90. That is, in the second period, the light source device 10 emits near-infrared excitation light. The light source device 10 is configured separately from the control device 90, but the light source device 10 may be provided inside the control device 90.

The insertion member 20 is connected to the light source device 10 via a light guide 30. The insertion member 20 is a rigid endoscope that is rigid and having an elongated shape, and can be inserted into a living body from a distal end portion 21 of the insertion member 20. The proximal end portion 23 (eyepiece portion) of the insertion member 20 is detachably connected to the camera head 50.

Light (normal light or near-infrared excitation light) supplied from the light source device 10 through the light guide 30 is emitted from the distal end portion 21 of the insertion member 20 toward the observation target in the subject. The emitted illumination light is reflected by the observation target in the living body, and enters the insertion member 20 again from the distal end portion 21. An observation optical system including one or a plurality of optical lenses is provided inside the insertion member 20. Reflected light from an observation target S is condensed by the observation optical system and guided into the camera head 50 through the proximal end portion (eyepiece portion) 23 of the insertion member 20.

More specifically, in a case where the normal light (white light) is emitted into the living body, the normal light (normal light reflected in the living body) through the living body is condensed by the optical system in the insertion member 20 and guided into the camera head 50. Hereinafter, the normal light condensed by the optical system in the insertion member 20 may be referred to as a first subject image. Furthermore, in a case where the near-infrared excitation light is emitted into the living body, the near-infrared excitation light reflected in the living body and the fluorescence emitted by exciting the fluorescent substance such as indocyanine green that accumulates in the lesion in the living body are condensed by the optical system in the insertion member 20 and guided into the camera head 50. Hereinafter, fluorescence (or near-infrared excitation light and fluorescence) condensed by the optical system in the insertion member 20 may be referred to as a second subject image.

Figure 2:
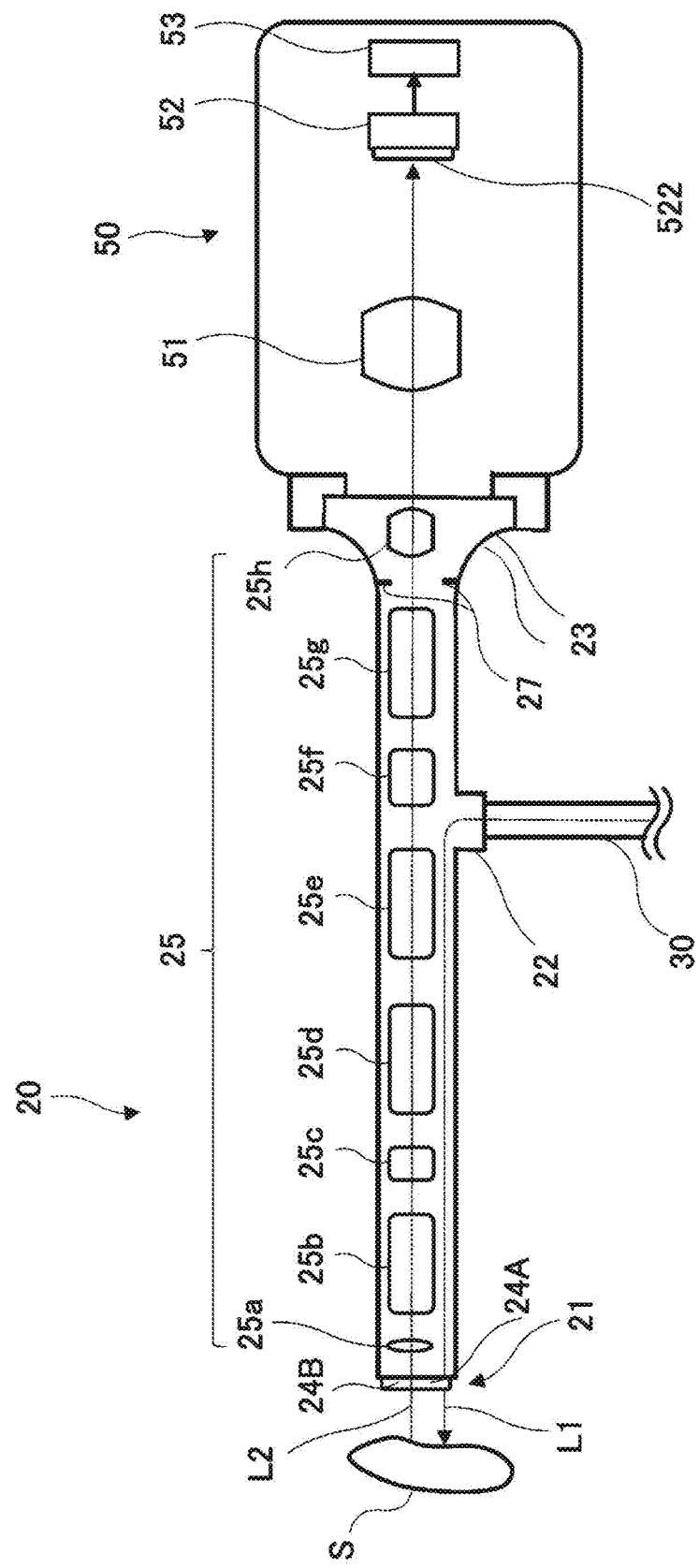
FIG. 2 is a diagram illustrating an internal configuration of an insertion member and a camera head.

FIG. 2 is a diagram illustrating an internal configuration of the insertion member 20 and the camera head 50. The distal end portion 21 of the insertion member 20 is provided with an emission portion 24A that emits light supplied from the light source device 10 via the light guide 30 toward a target region (observation target S) in the subject (living body). The emission portion 24A may include a lens or another member, or may be a space (hole). Light L1 (normal light or near-infrared excitation light) emitted from the emission portion 24A is reflected by a target region (observation target S) in the living body. The distal end portion 21 of the insertion member 20 is provided with an incident portion 24B on which a reflected wave (normal light or near-infrared excitation light) and fluorescence generated by excitation are incident. Light L2 incident on the incident portion 24B includes reflected light of normal light or includes reflected light of near-infrared excitation light and fluorescence. The incident portion 24B may include a lens or another member, or may be a space (hole). The light L2 enters the incident portion 24B and is guided again into the insertion member 20. Although the emission portion 24A and the incident portion 24B are provided separately, the emission portion 24A and the incident portion 24B may be the same.

An observation optical system 25 including optical lenses 25a, 25b, 25c, 25d, 25e, 25f, 25g, and 25h is provided inside the insertion member 20. The optical lens 25h at the final stage may be referred to as an eyepiece lens. The light L2 from the observation target S is condensed by the observation optical system 25 and guided to the camera head 50 via the proximal end portion 23 of the insertion member 20. At this time, a visual field mask 27 (rigid endoscope mask) is provided between the optical lens 25g and the optical lens 25h (eyepiece lens). The optical axis of the optical lens 25h (eyepiece lens), the central axis of the visual field mask 27, and the optical axes of the optical lenses 25a to 25g coincide with each other. The visual field mask 27 has, for example, a circular opening, and allows light corresponding to a visual field image to be observed by a user such as a doctor to pass therethrough. The light condensed by the observation optical system 25 is partially masked by the visual field mask 27 at the subsequent stage of the optical lens 25g, then condensed by the optical lens 25h, and guided into the camera head 50. Note that a configuration in which a visual field mask is not provided is also possible.

The camera head 50 corresponds to an imaging device that images a subject or an observation target of the subject. The camera head 50 is detachably connected to the proximal end portion 23 (eyepiece portion) of the insertion member 20. Under the control of the control device 90, the camera head 50 captures the first subject image (normal light) and the second subject image (fluorescence and near-infrared excitation light) condensed by the insertion member 20, and outputs an image signal by imaging. The image signal is, for example, an image signal of 4K or more.

A lens unit 51, an imaging unit 52 (first imaging unit, second imaging unit), and a communication unit 53 are provided inside the camera head 50. Each optical axis of the lens unit 51 and the imaging unit 52 coincides with the optical axis of the observation optical system 25 of the insertion member 20. The light L2 guided to the camera head 50 is condensed by the lens unit 51 and output to the imaging element 522 of the imaging unit 52. The imaging unit 52 exposes the light output to the imaging element 522 and converts the light into an electric signal, thereby generating an image signal of the observation target S. The communication unit 53 outputs the image signal to the transmission cable 80. A detailed configuration and operation of the camera head 50 will be described later.

One end of the transmission cable 80 is detachably connected to the control device 90, and the other end is detachably connected to the camera head 50. The transmission cable 80 transmits an image signal and the like output from the camera head 50 to the control device 90, and transmits a control signal, a synchronization signal, a clock, power, and the like output from the control device 90 to the camera head 50. Transmission of the image signal and the like from the camera head 50 to the control device 90 via the transmission cable 80 may be transmission by an optical signal or transmission by an electric signal. Similarly, transmission of a control signal, a synchronization signal, and a clock from the control device 90 to the camera head 50 via the transmission cable 80 may be transmission by an optical signal or transmission by an electric signal. Wireless transmission may be used instead of wired transmission by the transmission cable 80. Any method or standard such as a wireless local area network (LAN), Bluetooth (registered trademark), or infrared communication can be used.

The display device 70 is, for example, a display device such as a liquid crystal display or an organic electroluminescence (EL) display. The display device 70 receives the image signal processed by the control device 90 under the control of the control device 90, and displays an image (video) based on the image signal on a screen. The display device 70 may be connected to the control device 90 by a transmission cable and receive an image signal for display in a wired manner, or may receive an image signal for display by wireless transmission.

The control device 90 integrally controls operations of the light source device 10, the camera head 50, and the display device 70. For example, the control device 90 generates an image signal (video signal) for display by performing various types of image processing on the image signal of the observation target received from the camera head 50 via the transmission cable 80. Furthermore, the control device 90 transmits a control signal for controlling the light source device 10 to the light source device 10. The light source device 10 may be connected to the control device 90 by a transmission cable and receive a control signal for display in a wired manner, or may receive control by wireless transmission. The control device 90 may be realized by a general-purpose processor such as a central processing unit (CPU), a micro processing unit (MPU), or a graphics processing unit (GPU), or may be realized by an integrated circuit such as an application specific integrated circuit (ASIC) or a field programmable gate array (FPGA). In a case where the control device 90 is configured by a general-purpose processor, the function of the control device 90 is realized by causing the general-purpose processor to execute software or a program. A detailed configuration of the control device 90 will be described later.

Figure 3:
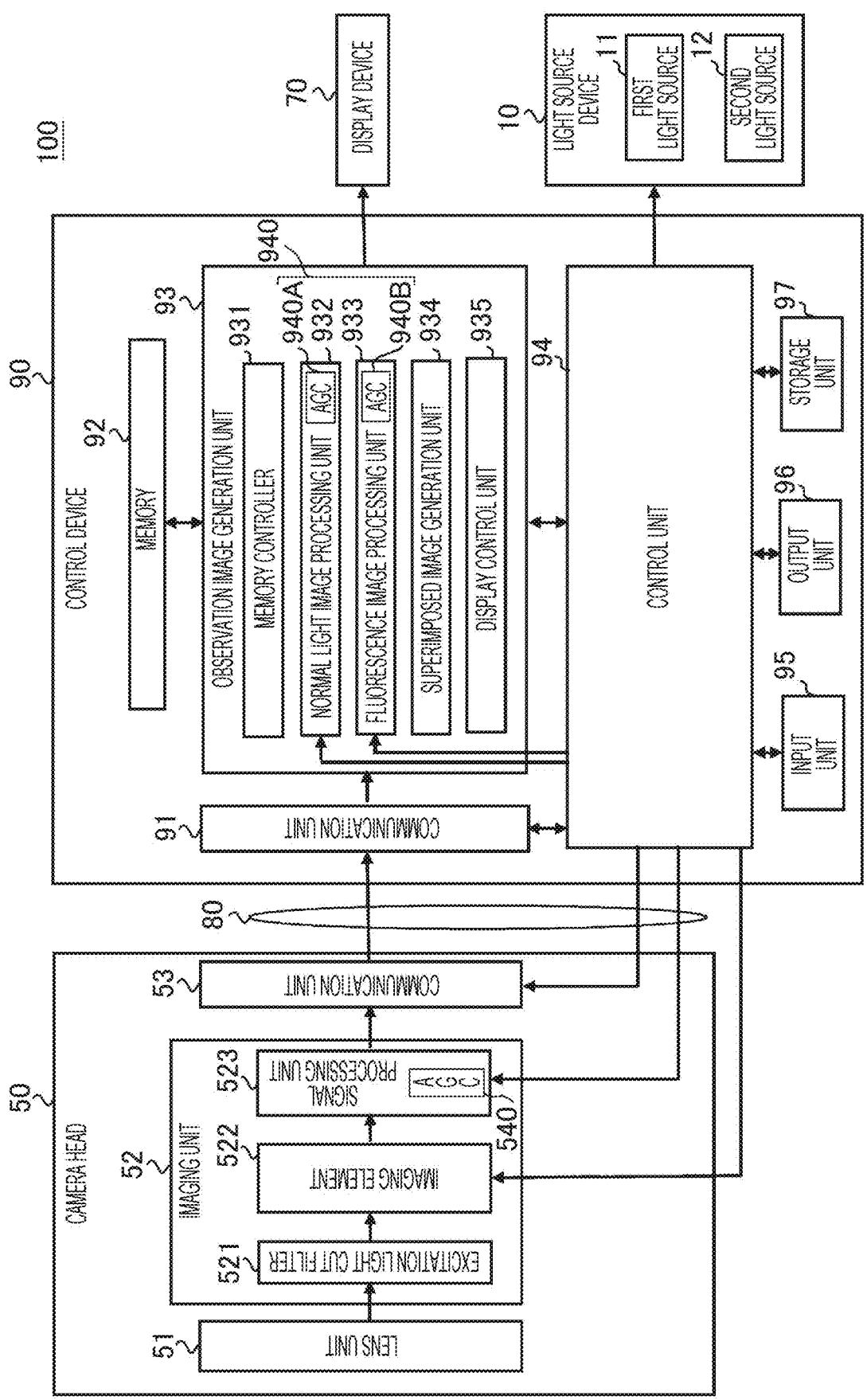
FIG. 3 is a block diagram illustrating configurations of a camera head and a control device.

FIG. 3 is a block diagram illustrating configurations of the camera head 50 and the control device 90.

(Configuration of Camera Head 50)

The camera head 50 includes a lens unit 51, an imaging unit 52, and a communication unit 53.

The lens unit 51 includes one or a plurality of lenses. The lens unit 51 condenses the first subject image (normal light) or the second subject image (fluorescence and near-infrared excitation light) condensed by the insertion member 20, and outputs the first subject image or the second subject image to an imaging surface of the imaging unit 52 (imaging element 522). The imaging unit 52 images the inside of the living body under the control of the control device 90. The imaging unit 52 includes a first imaging unit that generates a first image signal by exposing the first subject image (normal light) condensed by the lens unit 51 and a second imaging unit that generates a second image signal by exposing the second subject image (fluorescent light) condensed by the lens unit 51.

The imaging unit 52 includes an excitation light cut filter 521, an imaging element 522, and a signal processing unit 523.

The excitation light cut filter 521 is provided between the lens unit 51 and the imaging element 522, and includes a band stop filter that removes a specific wavelength band. The wavelength band to be cut (removed) by the excitation light cut filter 521 is referred to as a cut band. A wavelength band that is shorter than the cut band and passes through the excitation light cut filter 521 is referred to as a short-wavelength transmission band. A wavelength band that is longer than the cut band and passes through the excitation light cut filter 521 is referred to as a long-wavelength transmission band. The cut band includes at least a part of the wavelength band of the near-infrared excitation light. The long-wavelength transmission band includes a wavelength band of fluorescence. The long-wavelength transmission band may include a part of the wavelength band of the near-infrared excitation light in addition to the wavelength band of the fluorescence. In the following description, a case where the long-wavelength transmission band includes only the wavelength band of fluorescence will be described, but a part of the wavelength band of the near-infrared excitation light may be included. The short-wavelength transmission band includes a wavelength band (first wavelength band) of normal light (white light). That is, the excitation light cut filter 521 transmits the first subject image (normal light (white light)) from the lens unit 51 toward the imaging element 522. In addition, the excitation light cut filter 521 transmits the second subject image (fluorescence) from the lens unit 51 toward the imaging element 522. Note that the excitation light cut filter 521 is disposed in the camera head 50, but is not limited thereto, and may be disposed on an optical path of an optical system in the insertion member 20.

The imaging element 522 receives the light transmitted through the excitation light cut filter 521 and converts the light into an electric signal (analog signal). The imaging element 522 includes, for example, a charge coupled device (CCD), a complementary metal oxide semiconductor (CMOS), or the like. The imaging element 522 is commonly used for a first imaging unit that generates a first image signal by exposing a first subject image (normal light) and a second imaging unit that generates a second image signal by exposing a second subject image (fluorescent light), but may be separately provided.

A color filter which is an optical filter is provided on an imaging surface (light receiving surface) of the imaging element 522. In the color filter, three types of filters (R filter, G filter, B filter) divided according to a wavelength band of light (red (R), green (G), blue (B)) to be transmitted are arranged in a predetermined format. An example of an array format of each filter of RGB is a Bayer array. The R filter is a filter that mainly transmits light in the R wavelength band, the B filter is a filter that mainly transmits light in the B wavelength band, and the G filter is a filter that mainly transmits light in the G wavelength band. Note that the R, G, and B filters also transmit fluorescence (and near-infrared excitation light). The imaging element 522 has sensitivity not only to light in the R, G, and B wavelength bands but also to light in the fluorescent wavelength band (and near-infrared excitation light). Under the control of the control device 90, the imaging element 522 performs imaging every first period and every second period that are alternately repeated in synchronization with the light emission timing of the light source device 10.

Specifically, the imaging element 522 generates the first image signal by exposing the first subject image (normal light) in the first period. The exposure amount or the exposure time of the first subject image (normal light) in the first period of the imaging element 522 can be adjusted by the control unit 94. An image generated by imaging the first subject image (normal light) by the imaging element 522, that is, an image based on the first image signal is referred to as a normal light image (first image). The exposure amount or the exposure time of the first subject image corresponds to an example of a first control parameter or a first exposure amount adjustment parameter for adjusting the luminance of an image (normal light image) captured on the basis of white light (normal light).

Furthermore, the imaging element 522 captures the second subject image (fluorescence) in the second period to generate a second image signal. The exposure amount or the exposure time of the second subject image (fluorescence) in the second period of the imaging element 522 can be adjusted by the control unit 94. An image generated by capturing the second subject image, that is, an image based on the second image signal is referred to as a fluorescence image (second image). The exposure amount or the exposure time of the second subject image corresponds to an example of a second control parameter or a second exposure amount adjustment parameter for adjusting the luminance of an image (fluorescence image) captured on the basis of fluorescence.

The signal processing unit 523 performs various types of signal processing on the analog image signal (analog first image signal and second image signal) generated by the imaging element 522 and outputs a digital image signal (first digital image signal and second digital image signal, respectively). The first image signal represents a normal light image (first image), and the second image signal represents a fluorescence image (second image). The normal light image (first image) and the fluorescence image (second image) may be collectively referred to as a captured image. The signal processing unit 523 outputs a captured image (digital signal). The signal processing unit 523 includes a gain adjustment unit (auto gain control (AGC) circuit) 540 for performing analog gain adjustment. That is, the AGC circuit 540 performs AGC as signal processing. The AGC circuit 540 adjusts an analog gain of the first image signal (analog signal) captured on the basis of the normal light. The AGC circuit 540 adjusts an analog gain of the second image signal (analog signal) captured on the basis of the fluorescence. The amplitude (for example, luminance) of the image signal (analog signal) can be adjusted by adjusting the analog gain. The signal processing unit 523 performs AD conversion on the first image signal and the second image signal subjected to AGC or the like, and generates a digital first image signal and a digital second image signal, that is, an imaging signal (digital signal). The signal processing unit 523 is included in the imaging unit 52, but may exist as an independent functional unit between the imaging unit 52 and the communication unit 53.

The analog gain of the first image signal (analog signal) used by the gain adjustment unit 540 can be adjusted by the control unit 94. The analog gain of the first image signal (analog signal) corresponds to an example of a first control parameter or a first analog gain adjustment parameter for adjusting the luminance of an image (normal light image) captured on the basis of white light (normal light).

The analog gain of the second image signal (analog signal) used by the gain adjustment unit 540 can be adjusted by the control unit 94. The analog gain of the second image signal (analog signal) corresponds to an example of a second control parameter or a second analog gain adjustment parameter for adjusting the luminance of an image (fluorescence image) captured on the basis of fluorescence.

The gain adjustment unit 540 is commonly used for a first imaging unit that generates a first image signal by exposing a first subject image (normal light) and a second imaging unit that generates a second image signal by exposing a second subject image (fluorescent light), but may be separately provided.

The communication unit 53 transmits the captured image (digital signal) output from the imaging unit 52 to the control device 90 via the transmission cable 80. The communication unit 53 includes, for example, a high-speed serial interface that performs communication of a captured image at a high-speed transmission rate.

Configuration of Control Device 90

The control device 90 includes a communication unit 91, a memory 92, an observation image generation unit 93, a control unit 94, an input unit 95, an output unit 96, and a storage unit 97.

The communication unit 91 receives the captured image output from the camera head 50 via the transmission cable 80. The communication unit 91 includes, for example, a high-speed serial interface that communicates a captured image with the communication unit 53 of the camera head 50 at a high-speed transmission rate.

The memory 92 temporarily stores a plurality of frames of captured images sequentially output from the camera head 50. The memory 92 includes, for example, a volatile memory or a nonvolatile memory. As an example, the memory 92 includes a dynamic random access memory (DRAM) which is a volatile memory.

The observation image generation unit 93 processes the captured image sequentially output from the camera head 50 and received by the communication unit 91 under the control of the control unit 94. The observation image generation unit 93 includes a memory controller 931, a first image processing unit 932, a second image processing unit 933, a superimposed image generation unit 934, and a display control unit 935. Although the first image processing unit 932 and the second image processing unit 933 are separately provided, they may be combined as one image processing unit.

The memory controller 931 controls writing and reading of the captured image to and from the memory 92. More specifically, the memory controller 931 sequentially writes the captured images (normal light image and fluorescence image) sequentially output from the camera head 50 and received by the communication unit 91 in the memory 92. In addition, the memory controller 931 reads the normal light image from the memory 92 at a specific timing, and outputs the read normal light image to the first image processing unit 932. Further, memory controller 931 reads the fluorescence image from memory 92 at a specific timing, and outputs the read fluorescence image to second image processing unit 933.

The first image processing unit 932 performs first image processing on the input signal of the normal light image (digital first image signal). The first image processing unit 932 includes a gain adjustment unit (AGC circuit) 940A that adjusts a digital gain of a signal of a normal light image by auto gain control (AGC). The first image processing unit 932 performs digital gain adjustment of the signal of the normal light image as the first image processing. Specifically, the pixel value (RGB luminance value) of the normal light image is adjusted by adjusting the digital gain of the signal (RGB signal) of the normal light image.

Furthermore, the first image processing unit 932 may perform at least one of optical black subtraction processing, white balance adjustment processing, demosaic processing, color correction processing, and gamma correction processing as the first image processing. Furthermore, the first image processing unit 932 performs YC processing of converting an RGB signal (normal light image) subjected to processing such as AGC into a luminance signal and a chrominance signal (Y, Cb/Cr signal) as the first image processing. That is, in the YC processing, a luminance signal (Y value (hereinafter, referred to as WLI_Y)) and a chrominance signal (Cb value (hereinafter, referred to as WLI_Cb) and Cr value (hereinafter, referred to as WLI_Cr)) are calculated for each pixel on the basis of an RGB signal (normal light image) after processing such as AGC.

For example, WLI_Y is expressed by the following formula. "+" indicates an addition symbol, and "×" indicates a multiplication symbol.

$$WLI\_Y=DR{\times}R+DG{\times}G+DB{\times}B \quad (1)$$

where R is a pixel value of red (R), G is a pixel value of green (G), and B is a pixel value of blue (B). DR, DG, and DB are coefficients for R, G, and B, respectively. As an example, DR is 0.3, DG is 0.6, and DB is 0.1. The sum of DR, DG, and DB is 1. The DR, DG, and DB may be predetermined values or may be adjusted by the control unit 94 as described in other embodiments described later. The DR, DG, and DB may be stored in the memory 92 or the storage unit 97.

For example, WLI_Cb is expressed by the following formula.

$$WLI\_Cb=ER{\times}R+EG{\times}G+EB{\times}B \quad (2)$$

ER, EG, and EB are coefficients for R, G, and B, respectively. ER, EG, and EB may be predetermined values or may be adjusted by the control unit 94. ER, EG, and EB may be stored in the memory 92 or the storage unit 97. For example, WLI_Cr is expressed by the following formula.

$$WLI\_Cr=FR{\times}R+FG{\times}G+FB{\times}B \quad (3)$$

FR, FG, and FB are coefficients for R, G, and B, respectively. FR, FG, and FB may be predetermined values or may be adjusted by the control unit 94. FR, FG, and FB may be stored in the memory 92 or the storage unit 97. The second image processing unit 933 executes second image processing on the input fluorescence image. The second image processing unit 933 includes a gain adjustment unit (AGC circuit) 940B that adjusts the gain of the signal of the fluorescence image by AGC as the second image processing. The second image processing unit 933 performs gain adjustment of the signal of the fluorescence image by the AGC circuit 940B as the second image processing. Specifically, the pixel value of the fluorescence image is adjusted by adjusting the digital gain of the signal of the fluorescence image.

In addition, as the second image processing, the second image processing unit 933 performs processing of generating a luminance signal (Y value (hereinafter, referred to as IR_Y)) from the fluorescence image after AGC. As an example, each pixel value of the fluorescence image is acquired as the luminance signal IR_Y.

Although the first image processing unit 932 and the second image processing unit 933 are separately provided with the gain adjustment unit (AGC circuit), a gain adjustment unit (AGC circuit) commonly used for the first image processing unit 932 and the second image processing unit 933 may be provided. Hereinafter, the gain adjustment units (AGC circuits) 940A and 940B may be collectively referred to as a gain adjustment unit (AGC circuit) 940.

The digital gain for normal light used in the AGC circuit 940 can be adjusted by the control unit 94. The digital gain for normal light corresponds to an example of a first control parameter or a first digital gain adjustment parameter for adjusting the luminance of an image (normal light image) captured on the basis of white light (normal light).

The digital gain for fluorescence used in the AGC circuit 940 can be adjusted by the control unit 94. The digital gain for fluorescence corresponds to an example of a second control parameter or a second digital gain adjustment parameter for adjusting the luminance of an image (fluorescence image) captured on the basis of fluorescence.

The superimposed image generation unit 934 superimposes (composites) the normal light image after the first image processing is executed by the first image processing unit 932 and the fluorescence image after the second image processing is executed by the second image processing unit 933 with corresponding pixels in all the regions to generate a superimposed image (composite image). That is, the superimposed image generation unit 934 generates a superimposed image by superimposing a first image (normal light image) represented by a first image signal generated by exposing a first subject image (normal light) and a second image (fluorescent image) represented by a second image signal generated by capturing a second subject image. Hereinafter, a process of generating a superimposed image will be described in detail.

The superimposed image generation unit 934 acquires WLI_Y, WLI_Cb, and WLI_Cr in the normal light image after the first image processing is executed from the first image processing unit 932 for each pixel. Furthermore, the superimposed image generation unit 934 acquires IR_Y in the fluorescence image after the second image processing is executed from the second image processing unit 933 for each pixel. Furthermore, the superimposed image generation unit 934 acquires a predetermined Cb value (hereinafter, referred to as IR_Cb) and a predetermined Cr value (hereinafter, referred to as IR_Cr) for the fluorescence image. IR_Cb and IR_Cr may be stored in the memory 92 or the storage unit 97.

The superimposed image generation unit 934 performs a plurality of operations such as addition, multiplication, or subtraction on the basis of WLI_Y, WLI_Cb, and WLI_Cr and IR_Y, IR_Cb, and IR_Cr. As a result, the Y value (hereinafter, referred to as stacked_Y), the Cb value (hereinafter, referred to as stacked_Cb), and the Cr value (hereinafter, referred to as stacked_Cr) in the superimposed image are calculated for each pixel. Specifically, "stacked_Y", "stacked_Cb", and "stacked_Cr" are represented by the following formulas (4) to (6), respectively. Note that "−" indicates a subtraction symbol, "+" indicates an addition symbol, and "×" indicates a multiplication symbol.

$$\text{stacked\_}Y = (1-\alpha) \times WLI\_Y + \alpha \times \beta \times IR\_Y \quad (4)$$

$$\text{stacked\_}Cb = (1-\alpha) \times WLI\_Cb + \alpha \times IR\_Cb \quad (5)$$

$$\text{stacked\_}Cr = (1-\alpha) \times WLI\_Cr + \alpha \times IR\_Cr \quad (6)$$

In formulas (4) to (6), $\alpha$ is an alpha value. $\alpha$ may be a value determined in advance on the basis of knowledge of a user such as a doctor, or may be adjusted by the control unit 94. As an example, $\alpha$ takes a value of 0 or more and 1 or less. The alpha value may be stored in the memory 92 or the storage unit 97 described later. In a case where $\alpha$ is adjusted by the control unit 94, $\alpha$ may be determined on the basis of at least one of IR_Y, a gain (gain of normal light image, gain of fluorescence image), gamma setting of a normal light image, and the like. For example, $\alpha$ may be a value corresponding to IR_Y (for example, a value calculated by multiplying IR_Y by a coefficient).

$\beta$ is an adjustment coefficient for IR_Y. $\beta$ is a predetermined value, and takes, for example, a value of 0 or more and 1 or less. As an example, $\beta$ is 0.6.

However, $\beta$ may be adjusted by the control unit 94. In formulas (5) and (6), a coefficient corresponding to $\beta$, that is, an adjustment coefficient for IR_Cb and an adjustment coefficient for IR_Cr may be introduced.

As shown in formula (4), the Y value (stacked_Y) of each pixel (target pixel) in the superimposed image is generated by performing alpha blending between the Y value (WLI_Y) of the pixel (first corresponding pixel) corresponding to the target pixel in the normal light image and the Y value (IR_Y) of the pixel (second corresponding pixel) corresponding to the target pixel in the fluorescence image, using the alpha value ($\alpha$).

As shown in formula (5), the Cb value (stacked_Cb) of the target pixel in the superimposed image is generated by performing alpha blending of the Cb value (WLI_Cb) of the first corresponding pixel and the predetermined Cb value (IR_Cb) using the alpha value ($\alpha$).

As shown in formula (6), the Cr value (stacked_Cr) of the target pixel in the superimposed image is generated by performing alpha blending between the Cr value (WLI_Cr) of the first corresponding pixel and a predetermined Cr value (IR_Cr) by using the alpha value ($\alpha$).

Formulas (4) to (6) are examples, and "stacked_Y", "stacked_Cb", and "stacked_Cr" may be calculated using other formulas.

Although the example in which the YC processing of converting the normal light image (RGB signal) into the luminance signal and the chrominance signal (Y, Cb/Cr signal) is performed in the first image processing has been described, processing of performing alpha blending with the fluorescence image signal may be performed for each RGB signal without performing the YC processing.

For example, the pixel value (luminance value of RGB) of the target pixel in the superimposed image may be calculated by superimposing the pixel value (luminance value of RGB) of the first corresponding pixel in the normal light image and the RGB value of the specific pseudo color at a ratio using the alpha value.

Specifically, the pixel value (luminance value of RGB) of the target pixel in the superimposed image is calculated by weighting and summing the pixel value (luminance value of RGB) of the first corresponding pixel in the normal light image and the RGB value of the specific pseudo color with 1−$\alpha$ and $\alpha$, respectively. $\alpha$ may be determined according to the luminance value of the second corresponding pixel of the fluorescence image. The luminance control of the normal light image and the fluorescence image described in detail below disclosed in the present embodiment can cope with both the case of performing the YC processing and the case of not performing the YC processing. In the following description, it is assumed that the alpha blending processing is performed on the basis of the luminance signal and the chrominance signal (Y, Cb/Cr signal) obtained by the YC processing to calculate "stacked_Y", "stacked_Cb", and "stacked_Cr".

Under the control of the control unit 94, the display control unit 935 generates an image signal (video signal) for display on the basis of the superimposed image (stacked_Y, stacked_Cb, and stacked_Cr) generated by the superimposed image generation unit 934. The display control unit 935 outputs the generated video signal to the display device 70.

The control unit 94 controls the operations of the light source device 10, the camera head 50, and the display device 70 and controls the entire operation of the control device 90 by outputting a control signal.

The control unit 94 controls at least one of the light source device 10 (light source unit), the imaging unit 52, the gain adjustment unit 540, or the gain adjustment unit 940 (940A and 940B) on the basis of the luminance information (for example, the Y value (stacked_Y)) of the superimposed image generated by the superimposed image generation unit 934. As a result, the control unit 94 performs luminance control of adjusting the luminance of the normal light image (image based on the first image signal) and the luminance of the fluorescence image (image based on the second image signal) by feedback control.

Figure 4:
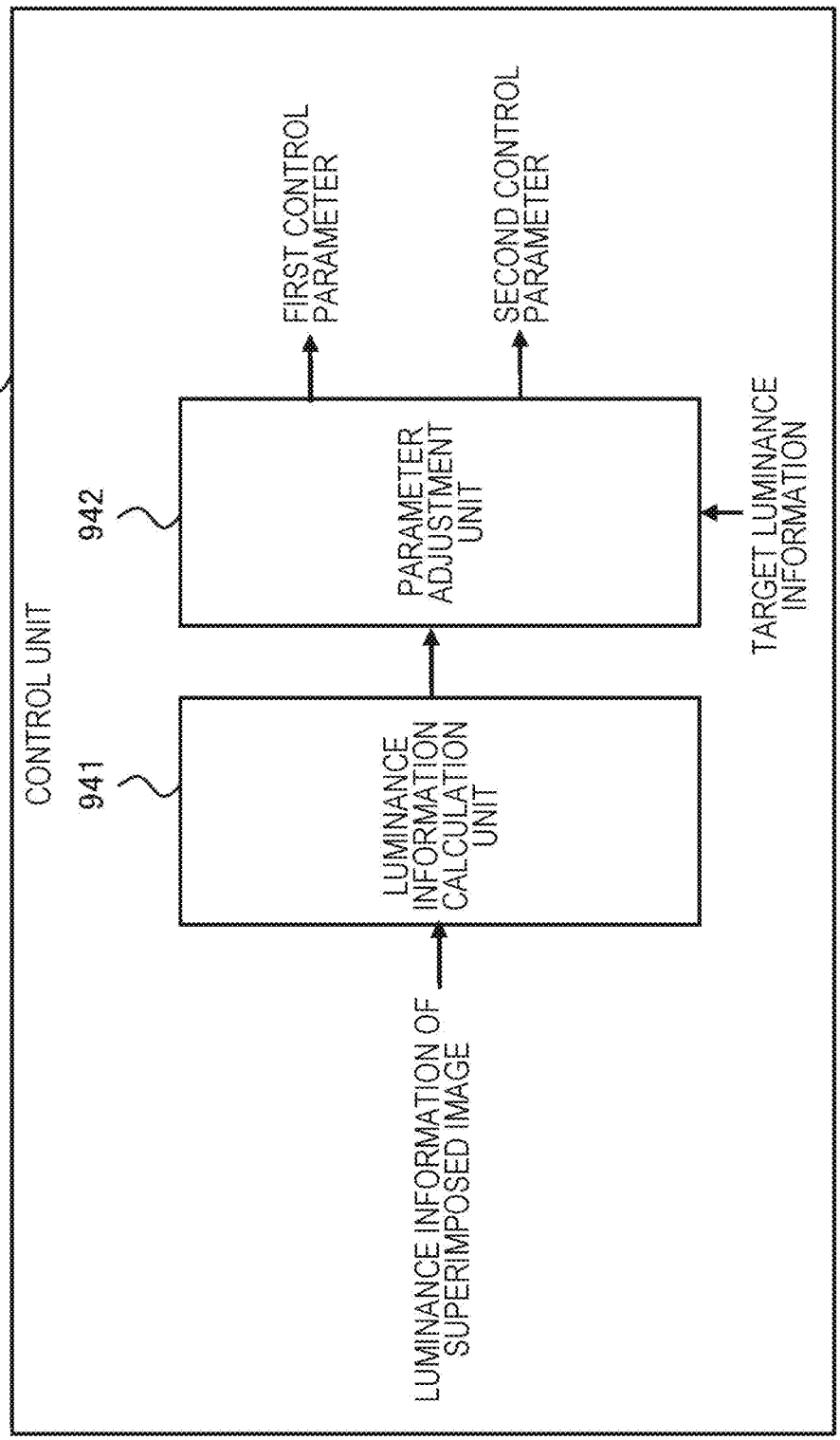
FIG. 4 is a block diagram of a configuration that performs luminance control in a control unit.

FIG. 4 is a block diagram of a configuration for performing luminance control in control unit 94. The control unit 94 includes a luminance information calculation unit 941 and a parameter adjustment unit 942. Hereinafter, the operation of the configuration illustrated in FIG. 4 will be described by exemplifying a case where each of the light source device 10 (light source unit), the imaging unit 52 (imaging element 522), the gain adjustment unit 540, and the gain adjustment units 940 (940A and 940B) is controlled.

(Control of Light Source Device 10)

An example in which the control unit 94 adjusts the luminance of the normal light image and the luminance of the fluorescence image by feedback-controlling the light source device 10 on the basis of the luminance information of the superimposed image and the target luminance information indicating the predetermined target luminance will be described.

The luminance information calculation unit 941 of the control unit 94 calculates luminance information of the superimposed image. As the luminance information of the superimposed image, there is an average value (average luminance) of luminance values (stacked_Y) of all pixels of the superimposed image. However, the luminance information may be a statistical value such as a median value, a maximum value, or a minimum value. In the following description, it is assumed that the luminance information is average luminance.

The parameter adjustment unit 942 adjusts the light emission luminance (light amount) of the first light source 11 as the first control parameter and the light emission luminance (light amount) of the second light source 12 as the second control parameter on the basis of the luminance information of the superimposed image and the target luminance information indicating the predetermined target luminance. Specifically, the first and second control parameters are adjusted so that the luminance information of the superimposed image matches or approaches the target luminance information, that is, the difference between the two is set to zero or approaches zero. By adjusting the light amount of the first light source 11, the luminance of the normal light image generated by the normal light image processing unit 932 can be adjusted. The luminance of the fluorescence image generated by the fluorescence image processing unit 933 can be adjusted by adjusting the light amount of the second light source 12. The control unit 94 transmits the first control parameter and the second control parameter adjusted by the parameter adjustment unit 942 to the first light source 11 and the second light source 12, respectively, as control signals.

When adjusting the light amount of the first light source 11 and the light amount of the second light source 12, the control unit 94 may satisfy a condition regarding a ratio between the light emission luminance (light amount) of the first light source 11 and the light emission luminance (light amount) of the second light source 12.

As a condition regarding the ratio, the ratio may be maintained to be the same before and after adjustment, or the ratio may be suppressed from varying before and after adjustment. For example, the light amounts of these light sources are adjusted so as to suppress the variation amount of the ratio of the light amounts of these light sources to a threshold or less. As a specific example of suppressing the variation in the ratio before and after the adjustment, the difference in the ratio may be equal to or less than a threshold or zero before and after the adjustment. For example, when the light amount of the first light source 11 is set to X times, the light amount of the second light source 12 is also set to X times.

As described above, the luminance information of the superimposed image is matched with or brought close to the target luminance information while the variation in the ratio between the light emission luminance (light amount) of the first light source 11 and the light emission luminance (light amount) of the second light source 12 is suppressed. The luminance information of each of the normal light image and the fluorescence image does not individually approach the target luminance, but the luminance information of the superimposed image matches or approaches the target luminance information.

As a result, it is possible to generate a superimposed image in which the luminance of the normal light image and the luminance of the fluorescence image are balanced regardless of the state of the observation target (for example, before and after the injection of the phosphor). As a specific method of adjusting the first control parameter and the second control parameter, for example, there is a method of increasing or decreasing the parameter value by a certain ratio. For example, when the luminance information of the superimposed image is lower than the target luminance information, the current values of the first control parameter and the second control parameter are multiplied by the same coefficient K1. For example, when the light amounts of the first light source 11 and the second light source 12 are each set to 1.1 times, K1=1.1. When the luminance information of the superimposed image is higher than the target luminance information, the current values of the first control parameter and the second control parameter are multiplied by the coefficient K2. For example, when the light amounts of the first light source 11 and the second light source 12 are each set to 0.9 times, K2=0.9. The value of the coefficient to be multiplied may be changed according to the magnitude of the difference between the luminance information of the superimposed image and the target luminance information. For example, the larger the difference, the larger the absolute value of the coefficient to be multiplied may be. In this case, for example, a table in which the value of the coefficient to be multiplied is determined for each magnitude of the difference may be used. Alternatively, a function that receives the difference as an input and outputs a value of a coefficient to be multiplied may be used. The values of the coefficients may be the same regardless of the magnitude of the difference. By making the value of the coefficient constant regardless of the magnitude of the difference, the change in the luminance of the normal image and the change in the fluorescence image can be smoothed, and thus the change in the display luminance (brightness) of the superimposed image can also be smoothed.

(Control of Imaging Unit 52 (Imaging Element 522))

An example in which the control unit 94 adjusts the luminance of the normal light image and the luminance of the fluorescence image by feedback-controlling the imaging unit 52 (imaging element 522) on the basis of the luminance information of the superimposed image and target luminance information indicating a predetermined target luminance will be described. The description of the same contents as the description of the control of the light source device 10 will be omitted or simplified as appropriate.

The luminance information calculation unit 941 of the control unit 94 calculates luminance information of the superimposed image. The parameter adjustment unit 942 of the control unit 94 adjusts the exposure amount (or exposure time) of the normal light in the imaging element 522 as the first control parameter on the basis of the luminance information of the superimposed image and the target luminance information. The parameter adjustment unit 942 of the control unit 94 adjusts the exposure amount (or exposure time) of the fluorescence as the second control parameter on the basis of the luminance information of the superimposed image and the target luminance information. Specifically, the first and second control parameters are adjusted such that the luminance information matches or approaches the target luminance information, that is, the difference between the luminance information and the target luminance information becomes zero or approaches zero. The exposure amount can be adjusted, for example, by controlling an electronic shutter in the imaging element 522 to adjust the amount of charge accumulated in the imaging element 522. When the exposure time is lengthened, the accumulated charge amount increases, and when the exposure time is shortened, the accumulated charge amount decreases. By adjusting the exposure amount of the normal light, the luminance of the normal light image generated by the normal light image processing unit 932 can be adjusted. The luminance of the fluorescence image generated by the fluorescence image processing unit 933 can be adjusted by adjusting the exposure amount of fluorescence. The control unit 94 transmits the first control parameter and the second control parameter adjusted by the parameter adjustment unit 942 to the imaging unit 52 (imaging element 522) as control signals.

The control unit 94 may satisfy a condition related to a ratio of an exposure amount of normal light and an exposure amount of fluorescence in the imaging element 522. As a condition regarding the ratio, the ratio may be maintained to be the same before and after adjustment, or the ratio may be suppressed from varying before and after adjustment. For example, these exposure amounts are adjusted so as to suppress the variation amount of the ratio of these exposure amounts to a threshold or less. As an example of suppressing the variation in the ratio of the exposure amount before and after the adjustment, the difference in the ratio of the exposure amount may be equal to or less than a threshold or zero before and after the adjustment. For example, when the exposure amount of the normal light is set to X times, the exposure amount of the fluorescence is also set to X times.

As described above, the luminance information of the superimposed image is matched with or brought close to the target luminance information while the variation in the ratio between the exposure amount of the normal light and the exposure amount of the fluorescence in the imaging element 522 is suppressed. That is, the luminance information of each of the normal light image and the fluorescence image does not individually approach the target luminance, but the luminance information of the superimposed image matches or approaches the target luminance information. As a result, it is possible to generate a superimposed image in which the luminance of the normal light image (luminance of white light) and the luminance of the fluorescence image (luminance of fluorescence) are balanced regardless of the state of the observation target (for example, before and after the injection of the phosphor). A specific method of adjusting the exposure amount of the normal light (first control parameter) and the exposure amount of the fluorescence (second control parameter) may be similar to the case of the control of the light source device 10.

(Control of Gain Adjustment Unit 540)

An example in which the control unit 94 adjusts the luminance of the normal light image and the luminance of the fluorescence image by feedback-controlling the gain adjustment unit 540 on the basis of the luminance information of the superimposed image and the target luminance information will be described. The description of the same contents as the description of the control of the light source device 10 will be omitted or simplified as appropriate.

The control unit 94 adjusts the analog gain of the normal light image in the gain adjustment unit 540 as the first control parameter. The control unit 94 adjusts the analog gain of the fluorescence image in the gain adjustment unit 540 as the second control parameter. Specifically, these analog gains are adjusted such that the luminance information of the superimposed image matches or approaches the target luminance information, that is, the difference between the two is set to zero or approaches zero. An example of the luminance information of the superimposed image is similar to the description of the control of the light source device 10 described above. The luminance of the normal light image is adjusted in an analog manner by adjusting the analog gain of the normal light image. The luminance of the fluorescence image is adjusted in an analog manner by adjusting an analog gain of a signal of the fluorescence image. The control unit 94 transmits the first control parameter and the second control parameter adjusted by the parameter adjustment unit 942 to the gain adjustment unit 540 as control signals.

The control unit 94 may satisfy a condition regarding a ratio between the analog gain of the normal light image and the analog gain of the fluorescence image. As a condition regarding the ratio, the ratio between the analog gain of the normal light image and the analog gain of the fluorescence image may be maintained to be the same before and after adjustment, or the ratio may be suppressed from varying before and after adjustment. For example, these analog gains are adjusted so that the variation amount of the ratio between the analog gain of the normal light image and the analog gain of the fluorescence image is suppressed to a threshold or less. As an example of suppressing the fluctuation of the ratio before and after the adjustment, the difference of the ratio may be equal to or less than a threshold or zero before and after the adjustment. For example, when one analog gain is multiplied by X, the other analog gain is also multiplied by X.

As described above, the luminance information of the superimposed image is matched with or brought close to the target luminance information while the variation in the ratio between the analog gain of the normal light image and the analog gain of the fluorescence image is suppressed. That is, the luminance information of each of the normal light image and the fluorescence image does not individually approach the target luminance, but the luminance information of the superimposed image matches or approaches the target luminance information. As a result, it is possible to generate a superimposed image in which the luminance of the normal light image (luminance of white light) and the luminance of the fluorescence image (luminance of fluorescence) are balanced regardless of the state of the observation target (for example, before and after the injection of the phosphor). A specific method of adjusting the analog gain (first control parameter) of the normal light image and the analog gain (second control parameter) of the fluorescence image may be similar to the case of the control of the light source device 10.

(Control of Gain Adjustment Unit 940)

An example in which the control unit 94 adjusts the luminance of the normal light image and the luminance of the fluorescence image by feedback-controlling the gain adjustment unit 940 on the basis of the luminance information of the superimposed image and the target luminance information will be described. The description of the same contents as the description of the control of the light source device 10 will be omitted or simplified as appropriate.

The control unit 94 adjusts the digital gain of the normal light image in the gain adjustment unit 940 as the first control parameter. The control unit 94 adjusts the digital gain of the fluorescence image in the gain adjustment unit 940 as the second control parameter. Specifically, the digital gains are adjusted such that the luminance information of the superimposed image matches or approaches the target luminance information, that is, the difference between the luminance information and the target luminance information becomes zero or approaches zero. An example of the luminance information of the superimposed image is similar to the description of the control of the light source device 10 described above. The luminance of the normal light image is digitally adjusted by adjusting the digital gain of the signal of the normal light image. The luminance of the fluorescence image is digitally adjusted by adjusting the digital gain of the signal of the fluorescence image.

The control unit 94 transmits the first control parameter and the second control parameter adjusted by the parameter adjustment unit 942 to the gain adjustment unit 940 as control signals.

The control unit 94 may satisfy a condition regarding a ratio between the digital gain of the normal light image and the digital gain of the fluorescence image. As a condition regarding the ratio, the ratio between the digital gain of the normal light image and the digital gain of the fluorescence image may be maintained to be the same before and after adjustment, or the ratio may be suppressed from varying before and after adjustment. For example, these digital gains are adjusted so that the variation amount of the ratio between the digital gain of the normal light image and the digital gain of the fluorescence image is suppressed to a threshold or less. As an example of suppressing the fluctuation of the ratio before and after the adjustment, the difference of the ratio may be equal to or less than a threshold or zero before and after the adjustment. For example, when one digital gain is multiplied by X, the other digital gain is also multiplied by X.

As described above, the luminance information of the superimposed image is matched with or brought close to the target luminance information while the variation in the ratio between the digital gain of the normal light image and the digital gain of the fluorescence image is suppressed. That is, the luminance information of each of the normal light image and the fluorescence image does not individually approach the target luminance, but the luminance information of the superimposed image matches or approaches the target luminance information. As a result, it is possible to generate a superimposed image in which the luminance of the normal light image (luminance of white light) and the luminance of the fluorescence image (luminance of fluorescence) are balanced regardless of the state of the observation target (for example, before and after the injection of the phosphor). A specific method of adjusting the digital gain (first control parameter) of the normal light image and the digital gain (second control parameter) of the fluorescence image may be similar to the case of the control of the light source device 10.

The input unit 95 is an operation device such as a mouse, a keyboard, and a touch panel. The input unit 95 receives an operation by a user such as a doctor. The input unit 95 generates an operation signal according to a user operation, and outputs the generated operation signal to the control unit 94.

The output unit 96 outputs various types of information. The output unit 96 includes, for example, a speaker, a printer, a communication device, an application, or the like.

The storage unit 97 stores a program executed by the control unit 94, information necessary for processing of the control unit 94, and the like.

Hereinafter, the operation of the control device 90 will be described.

Figure 5:
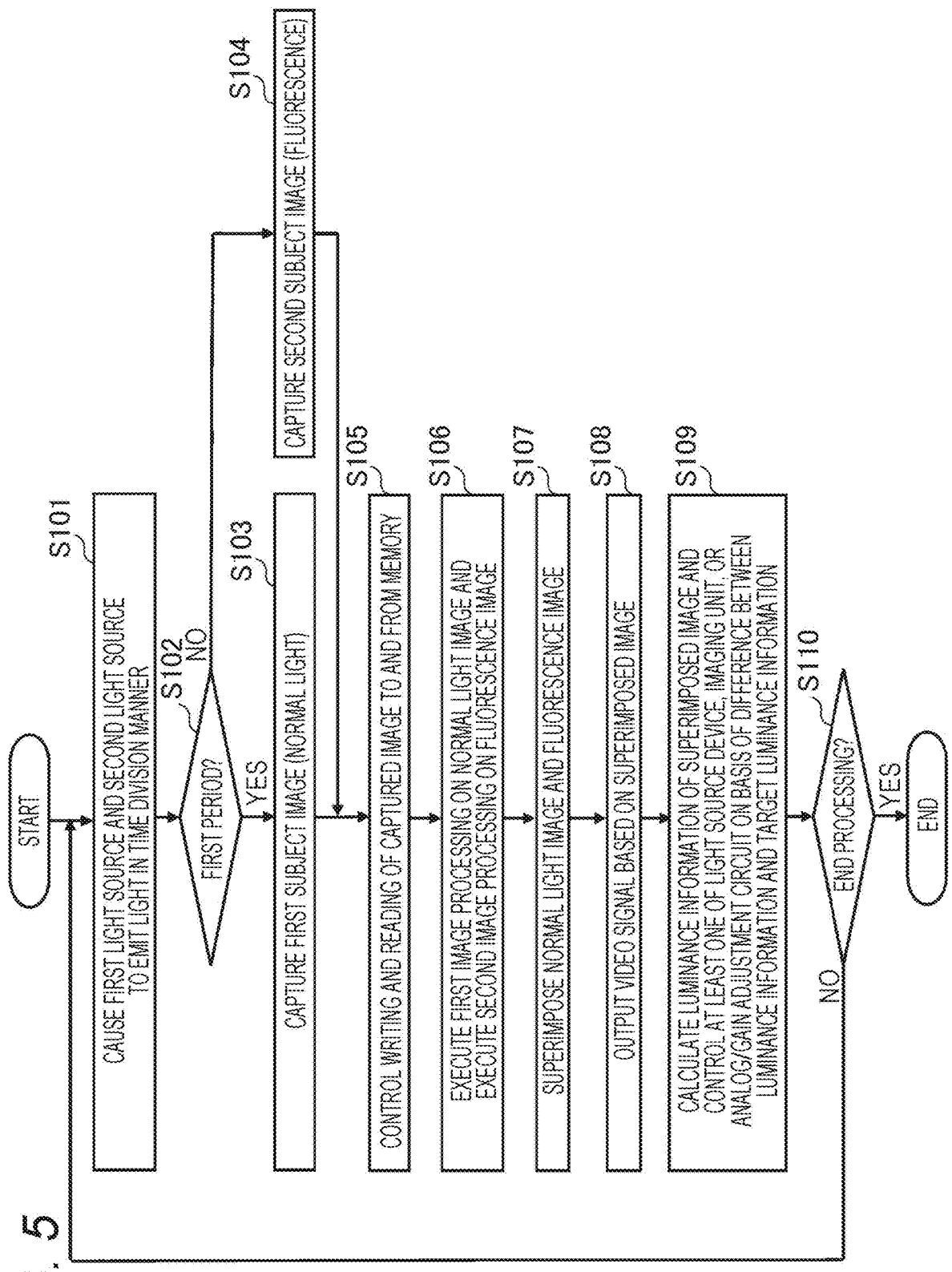
FIG. 5 is a flowchart illustrating an operation of the control device.

FIG. 5 is a flowchart illustrating an example of the operation of the control device 90.

The control unit 94 causes the first light source 11 and the second light source 12 to emit light in a time division manner (step S101). Specifically, on the basis of the synchronization signal, the control unit 94 causes the first light source 11 to emit light in a first period and causes the second light source 12 to emit light in a second period, out of the alternately repeated first period and second period.

The control unit 94 synchronizes the light emission timings of the first light source 11 and the second light source 12 on the basis of the synchronization signal.

The control unit 94 causes the imaging element 522 to capture the first subject image (normal light) and the second subject image (fluorescence) in the first period and the second period, respectively (steps S102 to S104).

That is, in a case where it is the first period (Yes in step S102), in other words, in a case where the normal light (white light) is emitted into the living body, the imaging element 522 captures the first subject image (normal light) and generates the normal light image (step S103). On the other hand, in a case where it is the second period (No in step S102), in other words, in a case where the near-infrared excitation light is emitted into the living body, the imaging element 522 captures the second subject image (fluorescence) and generates a fluorescence image (step S104).

The memory controller 931 controls writing and reading of the captured image to and from the memory 92 on the basis of the synchronization signal (step S105).

The first image processing unit 932 and the second image processing unit 933 execute the following processing (step S106).

That is, the first image processing unit 932 executes the first image processing on the normal light image sequentially read from the memory 92 by the memory controller 931, and outputs the normal light image (WLI_Y, WLI_Cb, and WLI_Cr) after the execution of the first image processing.

In addition, the second image processing unit 933 executes second image processing on the fluorescence image read from the memory 92 by the memory controller 931, and outputs the fluorescence image (IR_Y) after execution of the second image processing.

As shown in formulas (4) to (6), the superimposed image generation unit 934 superimposes the normal light image (WLI_Y, WLI_Cb, and WLI_Cr) output from the first image processing unit 932 and the fluorescence image (IR_Y) output from the second image processing unit 933 on pixels corresponding to each other. As a result, a superimposed image (stacked_Y, stacked_Cb, and stacked_Cr) is generated (step S107).

The display control unit 935 generates an image signal (video signal) for displaying the superimposed image generated by the superimposed image generation unit 934, and outputs the video signal to the display device 70 (step S108). As a result, the superimposed image is displayed on the display device 70.

The control unit 94 calculates luminance information of the superimposed image, and controls at least one of the light source device 10, the imaging unit 52, the gain adjustment unit 540, or the gain adjustment unit 940 so as to reduce a difference between the luminance information and the target luminance information (step S109). As a result, the luminance of the normal light image generated by the first image processing unit 932 and the luminance of the fluorescence image generated by the second image processing unit 933 are adjusted by feedback control.

Specifically, in a case of controlling the light source device 10, the light amount (first control parameter) of the first light source 11 and the light amount (second control parameter) of the second light source 12 are simultaneously adjusted. At this time, the light amounts of both the light sources may be adjusted so as to maintain a ratio of these light amounts at a constant ratio or suppress fluctuation of the ratio.

In the case of controlling the imaging unit 52, an exposure amount (first control parameter) in the case of performing normal light exposure and an exposure amount (second control parameter) in the case of performing fluorescent light exposure are simultaneously adjusted. At this time, both the exposure amounts may be adjusted so as to maintain the ratio of these exposure amounts at a constant ratio or suppress fluctuation of the ratio.

In a case of controlling the gain adjustment unit 540, the analog gain (first control parameter) of the normal light image and the analog gain (second control parameter) of the signal of the fluorescence image are simultaneously adjusted. At this time, both the gains may be adjusted so as to maintain the ratio of these analog gains at a constant ratio or suppress fluctuation of the ratio.

In the case of controlling the gain adjustment unit 940, the digital gain (first control parameter) of the signal of the normal light image and the digital gain (second control parameter) of the fluorescence image are simultaneously adjusted. At this time, both the gains may be adjusted so as to maintain the ratio of these digital gains at a constant ratio or suppress fluctuation of the ratio.

After step S109, the control unit 94 determines whether or not to end the processing of the control device 90.

For example, in a case where an observation end instruction input is received from a user such as a doctor via the input unit 95, it is determined to end the processing. When the control unit 94 determines to end the processing (No in step S110), the control unit 94 ends the processing. In a case where the control unit 94 determines to continue the present processing, the process returns to step S101. Thereafter, steps S101 to S109 are repeated until it is determined to end the processing. When the process is repeated, the first control parameter and the second control parameter are changed from the previous process by the luminance control performed in step S108.

As described above, according to the present embodiment, the first control parameter and the second control parameter are adjusted such that the luminance information of the superimposed image matches or approaches the target luminance information. As a result, the luminance of the normal light image generated by the normal light image processing unit 932 and the luminance of the fluorescence image generated by the fluorescence image processing unit 933 are adjusted. At this time, for example, when the light source device 10 is adjusted, the light amount of each of the first light source 11 and the second light source 12 is adjusted while the ratio of the light amount of each of the first light source 11 and the second light source 12 is maintained constant. In the case of adjusting the imaging unit 52, for example, the exposure amounts of the normal light and the fluorescence are adjusted while the ratio of the exposure amounts of the normal light and the fluorescence is maintained constant. In the case of adjusting the gain adjustment unit 940, for example, the digital gains of the normal light image and the fluorescence image are adjusted while the ratio of the digital gains of the normal light image and the fluorescence image is maintained constant. In the case of adjusting the gain adjustment unit 540, for example, the analog gain of each of the normal light image and the fluorescence image is adjusted while maintaining the ratio of the analog gain of the normal light image and the analog gain of the fluorescence image constant. As a result, it is possible to generate a superimposed image in which the luminance of the normal light image (luminance of white light) and the luminance of the fluorescence image (luminance of fluorescence) are balanced regardless of the state of the observation target (for example, before and after the injection of the phosphor).

For example, in a case where the phosphor has not yet been injected into the living body, the observation target has no or very low sensitivity to infrared rays (IR). In this case, the luminance of the normal light image generated by the normal light image processing unit 932 is high, and the luminance of the fluorescence image generated by the fluorescence image processing unit 933 is low or 0. Therefore, the luminance ($\alpha \times \beta \times IR\_Y$) of the fluorescence decreases in the luminance of the superimposed image, the luminance ($(1-\alpha) \times WLI\_Y$) of the normal light becomes dominant, and the luminance control of the normal light image and the fluorescence image is performed so that the luminance of the normal light substantially approaches the target luminance. As a result, the superimposed image in which the luminance of the normal light is dominant can be observed in a state of being close to the target luminance or the target luminance. In this manner, the superimposed image having high sensitivity to white light can be observed with the target luminance.

Figure 6:
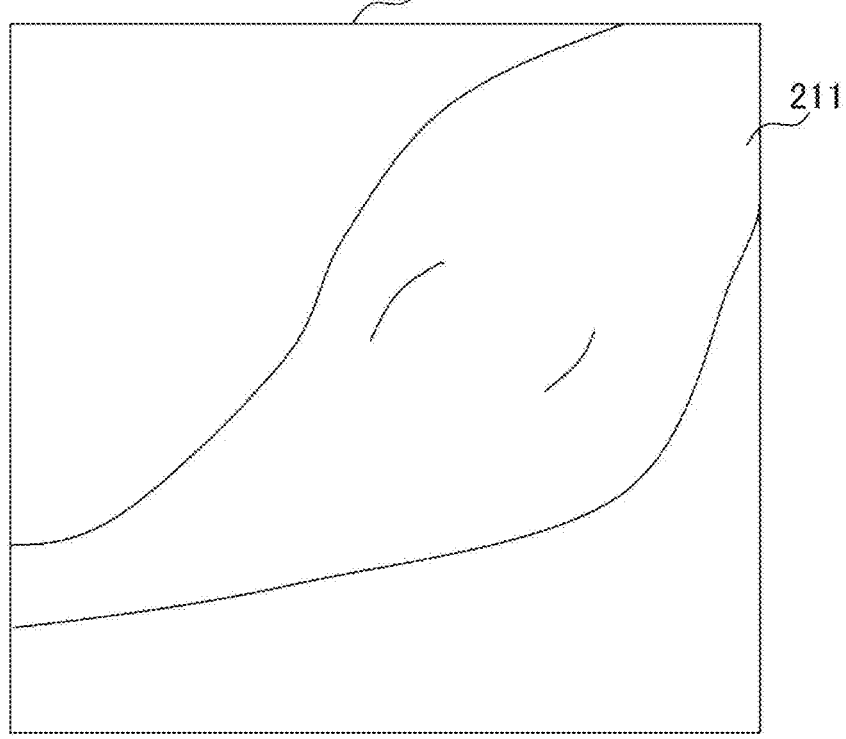
FIG. 6 is a diagram illustrating a display example of a superimposed image having high sensitivity of white light.

FIG. 6 illustrates a display example of a superimposed image 210 having high sensitivity of white light generated according to the present embodiment. An image 211 which is a part of the superimposed image 210 is an image of a part observed by a user such as a doctor. The luminance of normal light is dominant. The superimposed image 210 is displayed with noise suppressed.

Figure 7:
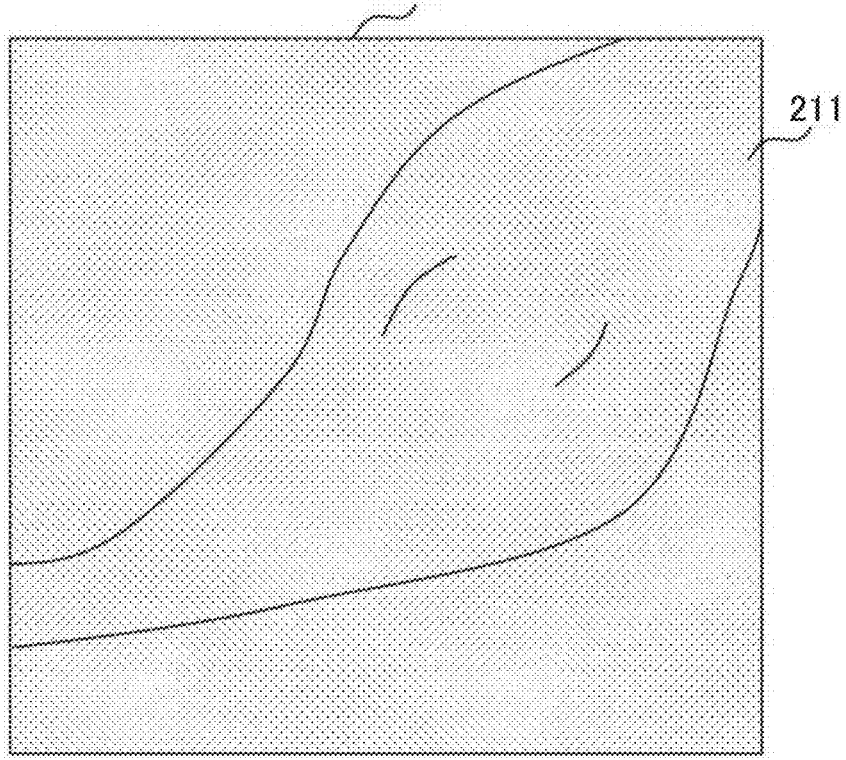
FIG. 7 is a diagram illustrating an example in which a superimposed image is generated by a related art.

On the other hand, FIG. 7 illustrates an example in which the superimposed image D1 is generated by adjusting the light amounts of the white light source (white light source) and the near-infrared light source (near-infrared light source) according to the related art. A large number of dots illustrated in FIG. 7 represent noise.

The superimposed image D1 is an image acquired before the phosphor is injected into the observation target. The luminance control according to the present embodiment, that is, the luminance feedback control using the luminance information of the superimposed image is not performed. In the related art, since the light amount of the near-infrared light source and the gain setting amount of the fluorescence image are increased, the fluorescence image becomes too bright, and noise in the superimposed image increases.

When a phosphor is injected into a living body in this state in which the phosphor has not yet been injected into the living body, the sensitivity to IR in the observation target rapidly increases. In this case, the luminance of the fluorescence image increases, and the ratio of the luminance of the fluorescence to the luminance of the superimposed image increases. By performing luminance control on the normal light image and the fluorescence image so that the luminance of the superimposed image approaches the target luminance, the luminance of the superimposed image is maintained in a state of being close to the target luminance or the target luminance. In addition, since the ratio of the values of the first control parameter for the normal light to be controlled and the second control parameter for the fluorescence is also maintained, the luminance of the fluorescence in the superimposed image does not become too high or noise does not occur. As a result, it is possible to observe a superimposed image in which the luminance of the normal light and the luminance of the fluorescence are balanced. That is, the user such as a doctor does not feel uncomfortable that the brightness of the superimposed image suddenly fluctuates greatly and the screen looks bright.

Figure 8:
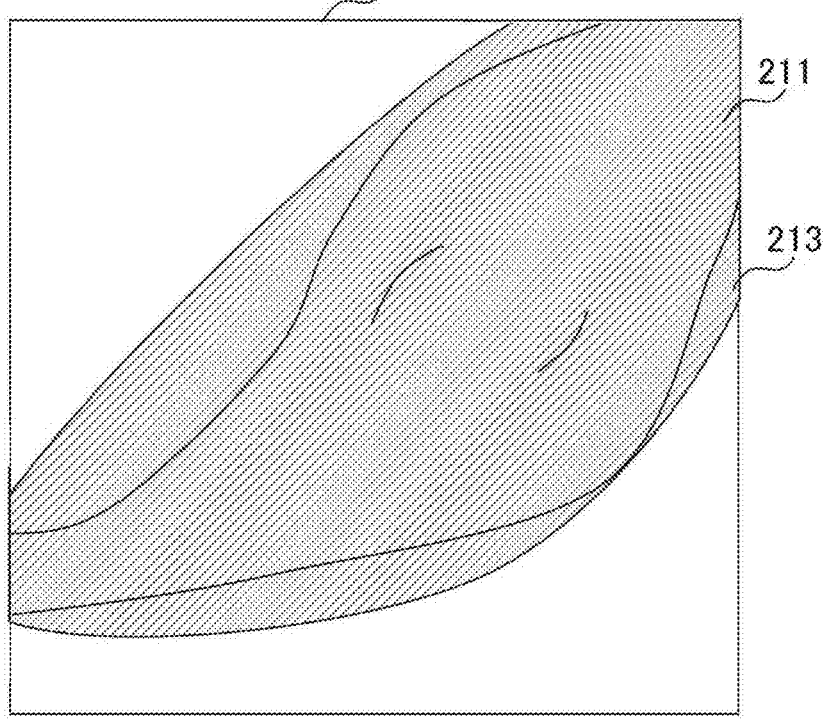
FIG. 8 is a diagram illustrating a display example of a superimposed image having a large ratio of luminance of fluorescence.

FIG. 8 illustrates a display example of a superimposed image 220 generated according to the present embodiment, that is, the superimposed image 220 generated in a case where a phosphor is injected into a living body and a ratio of luminance of fluorescence increases. A portion 213 where the intensity of the fluorescent component is high (IR_Y is large) is represented by hatching. The luminance of the fluorescence does not become too high, and an image is displayed with a balance between the luminance of the normal light and the luminance of the fluorescence.

Figure 9:
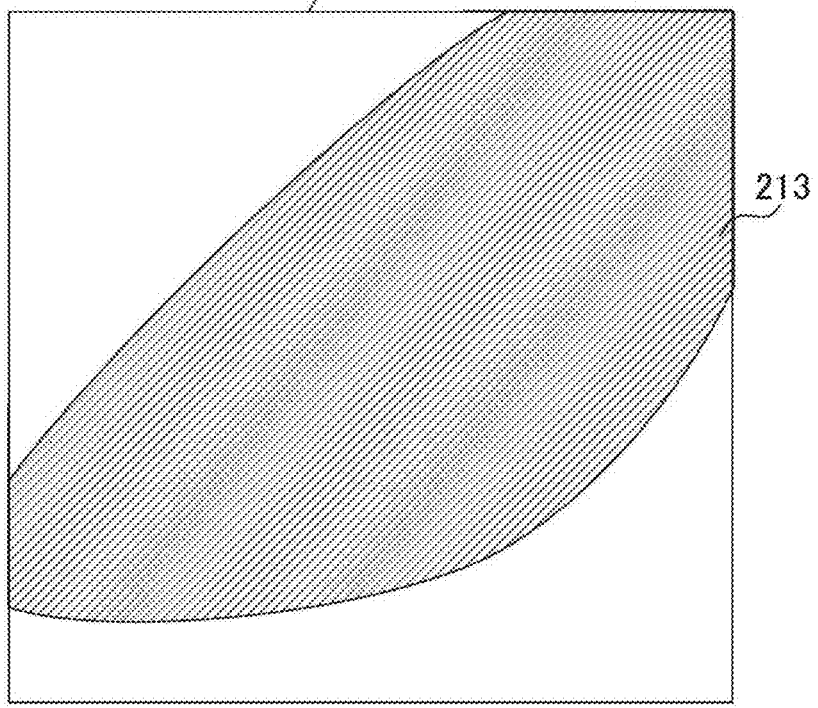
FIG. 9 is a diagram illustrating an example of a superimposed image generated by a related art.

FIG. 9 illustrates an example of a superimposed image D2 generated by a method of adjusting the luminance of the near infrared rays emitted from the near infrared light source following the luminance of the white image according to the related art. In this method, the fluorescence image is not too bright or noise is generated not much, but the brightness of the fluorescence image is not properly reflected in the superimposed image, so that the superimposed image is too bright. The portion of the image 211 that is clearly visible in FIG. 6 is not visible or is not easily visible in FIG. 9.

Thereafter, when the IR sensitivity in the observation target decreases after a lapse of a while, the luminance of the normal light becomes dominant again in the luminance of the superimposed image. Also in this case, as a result of performing luminance control to bring the luminance of the superimposed image closer to the target luminance, the superimposed image in which the luminance of the normal light becomes dominant is observed. Also in this case, since the superimposed image is observed in a state of being close to the target luminance or the target luminance, the user such as a doctor does not feel uncomfortable due to a sudden large change in luminance.

(Modification)

In the first embodiment, the set of the first control parameter and the second control parameter to be adjusted is at least one of a set of light amounts of normal light and fluorescence, a set of exposure amounts of normal light and fluorescence, a set of analog gains of images of normal light and fluorescence, or a set of digital gains of images of normal light and fluorescence. These sets are all sets of parameters of the same type. As a modification example, sets of different types of parameters may be adjusted. For example, the set of the first control parameter and the second control parameter to be adjusted may be a set of the light amount of the normal light and the exposure amount of the fluorescence, or may be a set of the analog gain of the normal light and the digital gain of the fluorescence. In this case, for example, correspondence data indicating correspondence between the adjustment magnification of the light amount of the normal light and the adjustment magnification of the exposure amount of the fluorescence may be held in the memory 92 or the storage unit 97 in the form of a table or a function. The control unit 94 may adjust the amount of normal light and the exposure amount of fluorescence on the basis of the correspondence data.

Second Embodiment

In the first embodiment, the luminance control of the normal light image and the fluorescence image is performed by executing at least one of the four types of luminance control (light amount control, exposure amount control, analog gain control, digital gain control). Specifically, in the light amount control, the light amount of the normal light and the light amount of the IR are adjusted as the first control parameter and the second control parameter, respectively. In the exposure amount control, the exposure amount of normal light and the exposure amount of fluorescence were adjusted as the first control parameter and the second control parameter, respectively. In the analog gain control, the analog gain of the normal light image and the analog gain of the fluorescence image are adjusted as the first control parameter and the second control parameter, respectively. In the digital gain control, the digital gain of the normal light image and the digital gain of the fluorescence image are adjusted as the first control parameter and the second control parameter, respectively. In the second embodiment, priority is set to at least two of the four types of luminance control, and the at least two types of luminance control are executed according to the priority.

Specifically, the first control parameter includes at least two of a first light amount adjustment parameter for adjusting the light amount of the first light source 11, a first exposure amount adjustment parameter for adjusting the exposure amount of the normal light (reflected light) in the first imaging unit, a first analog gain adjustment parameter for adjusting the analog gain of the first image signal obtained by imaging in the first imaging unit, and a first digital gain adjustment parameter for adjusting the digital gain of the first image signal. The control unit 94 sets a first priority order for the at least two parameters.

The second control parameter includes at least two of a second light amount adjustment parameter for adjusting the light amount of the second light source 12, a second exposure amount adjustment parameter for adjusting the exposure amount of fluorescence in the second imaging unit, a second analog gain adjustment parameter for adjusting the analog gain of the second image signal obtained by imaging in the second imaging unit, and a second digital gain adjustment parameter for adjusting the digital gain of the second image signal. The control unit 94 sets the second priority order to the at least two parameters.

For example, in a case where the luminance information of the superimposed image is larger than the target luminance information and it is necessary to lower the luminance information, the control unit 94 prioritizes the first: light amount control and the second: exposure amount control. That is, the first priority order is the order of the first light amount adjustment parameter and the first exposure amount adjustment parameter, and the second priority order is the order of the second light amount adjustment parameter and the second exposure amount adjustment parameter.

For example, when the exposure amount (exposure time) is reduced (when the electronic shutter is narrowed), the information amount of each image is reduced by the shortened exposure time, and the user observing the displayed video (moving image) may have a sense of discontinuity. Therefore, first, the light amount is preferentially reduced by luminance control of the light source device. After the light amount becomes equal to or less than the threshold and the brightness of light emission is suppressed to some extent, the exposure amount is reduced (electronic shutter is narrowed). This makes it difficult to generate the discontinuous feeling of the video.

A condition may be that the same type of parameter is adjusted for the first control parameter and the second control parameter. In this case, the first priority order and the second priority order may be combined into one, the first order may be (first light amount adjustment parameter and second light amount adjustment parameter), and the second order may be (first exposure amount adjustment parameter and second exposure amount adjustment parameter).

Furthermore, in a case where the luminance information of the superimposed image is smaller than the target luminance information and the luminance information needs to be made higher, the control unit 94 prioritizes the following: first: light amount control, second: gain control (analog gain control), third: gain control (digital gain control), and fourth: exposure control. That is, the first priority order is the order of the first light amount adjustment parameter, the first analog gain adjustment parameter, the first digital gain adjustment parameter, and the first exposure amount adjustment parameter. The second priority order is the order of the second light amount adjustment parameter, the second analog gain adjustment parameter, the second digital gain adjustment parameter, and the second exposure amount adjustment parameter.

When the exposure amount is increased (exposure time is increased), the brightness of the captured image can be increased, but the frame rate decreases. In this case, the quality of the video (moving image) may be affected. Therefore, the priority order of the exposure control is set to the end. The gain control can increase the brightness of the signal, but the noise feeling can be emphasized. Therefore, the priority order of the luminance control of the light source device is set to the highest. In the gain control, since the noise feeling can be emphasized in the digital gain used in the image processing as compared with the analog gain used in the imaging unit, the control of the analog gain is performed in preference to the control of the digital gain. The timing of switching the type of the luminance control can be determined by an arbitrary method that can achieve the purpose, for example, according to a difference between the luminance information of the superimposed image and the target luminance information. For example, as the absolute value of the difference is larger, luminance control with a higher priority is performed. In this case, the type of luminance control to be used may be determined using a table in which the value range of the absolute value of the difference and the type of luminance control to be applied are associated with each other. In addition, these luminance controls may be cyclically performed a predetermined number of times in order according to the priority order. The type of luminance control to be used may be switched by another method.

A condition may be that the same type of parameter is adjusted for the first control parameter and the second control parameter. In this case, the first priority order and the second priority order may be combined into one, and the first order may be (first light amount adjustment parameter and second light amount adjustment parameter), the second order may be (first analog gain adjustment parameter and second analog gain adjustment parameter), the third order may be (first digital gain adjustment parameter, second digital gain adjustment parameter), and the fourth order may be (first exposure amount adjustment parameter and second exposure amount adjustment parameter).

Third Embodiment

In the first or second embodiment, when the luminance information of the superimposed image is controlled to match or approach the target luminance information, a statistical value such as an average value of luminance values (pixel values) of all pixels of the superimposed image is used as the luminance information of the superimposed image. In the third embodiment, another example of calculating the luminance information of the superimposed image will be described.

(Calculation Example 1 of Luminance Information)

The luminance information of the superimposed image may be an average of luminance values of a target image of a part of the superimposed image instead of all pixels of the superimposed image. As an example, the target image may be an image of a partial region including the center of the superimposed image.

Figure 10A:
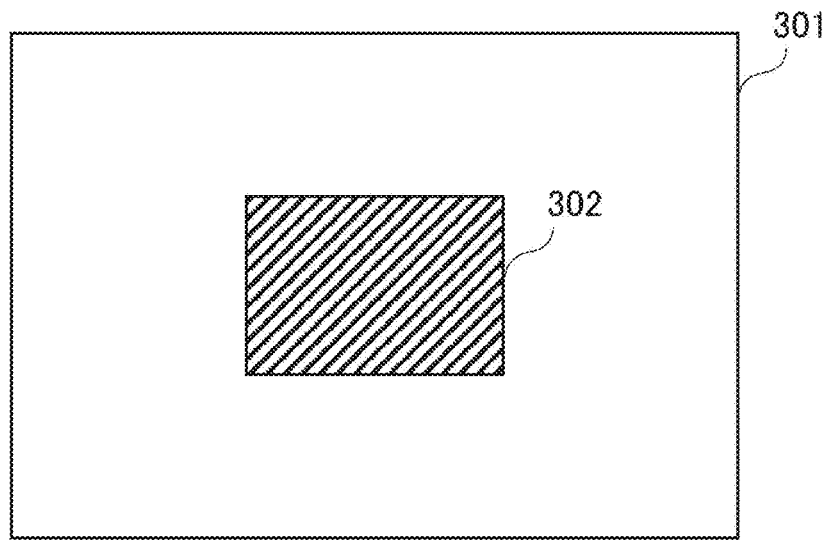
FIGS. 10A and 10B are diagrams illustrating an example of a target image and a peripheral image, and an example of calculating a weighted average value of luminance between the target image and a part of the peripheral image.

FIG. 10A illustrates an example in which an image portion (first image portion) including the center as the first position of the superimposed image 301 is set as the target image 302. The first position is not limited to the center, and may be arbitrarily determined according to an area observed by the user. For example, a position of interest in the superimposed image 301 by the user may be detected by eye tracking, and the detected position may be set as the first position. For example, an eye tracking device that irradiates the user's eyes with infrared rays, captures an image of a portion including the user's eyes, and analyzes the captured image to detect the first position where the user is looking may be provided. The control unit 94 calculates an average value of the luminance values using the target image 302, and sets the calculated average value as luminance information of the superimposed image. In a case where the target image 302 is a region observed by the user such as a doctor, luminance adjustment (adjustment of the first control parameter for normal light and the second control parameter for fluorescence) is performed in accordance with the observation target observed at the center. Therefore, even if the image of forceps or halation is included in the peripheral image outside the target image 302, the central image is not affected by the peripheral image. That is, it is possible to prevent the central image from becoming bright due to the influence of the surrounding image.

The target image (first image portion) and a peripheral image (second image portion) of a part or the whole of the periphery of the target image may be weighted. In this case, a weighted average value is calculated for the entire superimposed image, and the weighted average value is used as the luminance information.

Figure 10B:
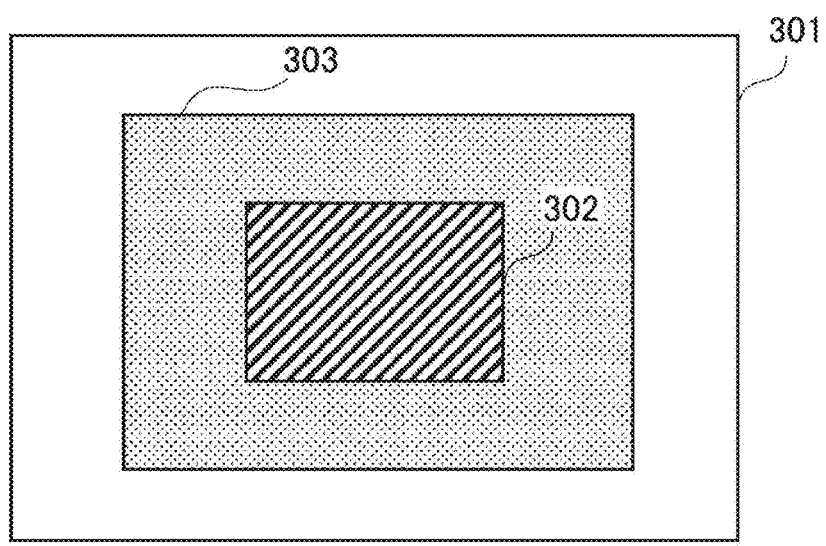

FIG. 10B illustrates an example of calculating the weighted average value. The control unit 94 sets a weight of a pixel of the target image 302 in the superimposed image 301 as a first weight W1, and a weight of a peripheral image 303 of a part around the target image 302 as a second weight W2. The control unit 94 multiplies the luminance value of each pixel of the target image 302 by W1, and multiplies the luminance value of each pixel of the peripheral image 303 by W2. The control unit 94 calculates a weighted average value by summing all the luminance values multiplied by the weights W1 and W2 and dividing the total value by the number of all the pixels of the superimposed image 301. The control unit 94 may adjust the values of W1 and W2 according to the average luminance of the target image 302, the average luminance of the peripheral image 303, and the like. The weight W1 of the target image and the weight W2 of the surrounding image may be fixed in advance.

According to the method of FIG. 10B, the first and second control parameters can be adjusted in consideration of not only the central portion of the superimposed image but also the luminance (brightness) of the peripheral image. For example, in a case where a user such as a doctor observes the lumen in the central portion of the screen, the central portion in the image (superimposed image) displayed on the screen tends to be dark and the peripheral portion tends to be bright. In this case, by increasing the weight W2 of the peripheral portion of the superimposed image, the central portion is also adjusted to be bright by the luminance control of the present embodiment. On the other hand, when observation is performed perpendicularly to the wall surface, the central portion of the image tends to be bright and the peripheral portion tends to be dark. In this case, by increasing the weight W1 of the central portion of the superimposed image, the peripheral portion is also adjusted to be bright by the luminance control of the present embodiment.

(Calculation Example 2 of Luminance Information)

The control unit 94 may calculate the average value of the luminance values of the superimposed image by excluding specific pixels or specific regions in the superimposed image.

For example, the average value of the luminance values of the superimposed image may be calculated on the basis of the luminance value of the image of the unmasked region except for the image of the region masked with the visual field mask 27 (see FIG. 2) in the superimposed image.

Figure 11:
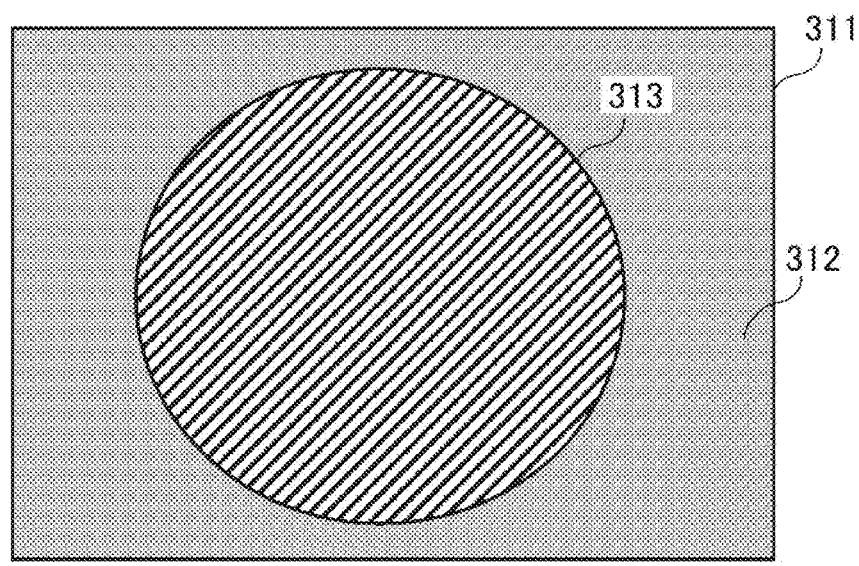
FIG. 11 is a diagram illustrating an image of a mask region and an image of a non-mask region in a superimposed image.

FIG. 11 illustrates an image 312 of a region masked from the superimposed image 311 and an image 313 of the remaining circular region (observation region).

For example, control unit 94 can specify image 312 of the masked region by detecting the region in which the luminance value is less than the threshold (first threshold). That is, the control unit 94 can specify the image 313 of the observation area by detecting pixels equal to or larger than the threshold (first threshold). The control unit 94 calculates the average value of the luminance values using the image 313 of the observation area including the pixels equal to or larger than the threshold. By excluding the image 312 in the masked region, luminance information can be calculated by excluding an image portion with low luminance. For example, since the masked portion is not observed by the user such as a doctor, by excluding the masked portion from the target of the luminance adjustment, only a region effective for observation can be set as the target of the luminance control.

(Calculation Example 3 of Luminance Information)

The control unit 94 may fix (clip) the luminance value of the pixel whose luminance value is saturated in the superimposed image by a specific value, and calculate the average value of the luminance of the entire superimposed image after clipping as the luminance information.

Figure 12:
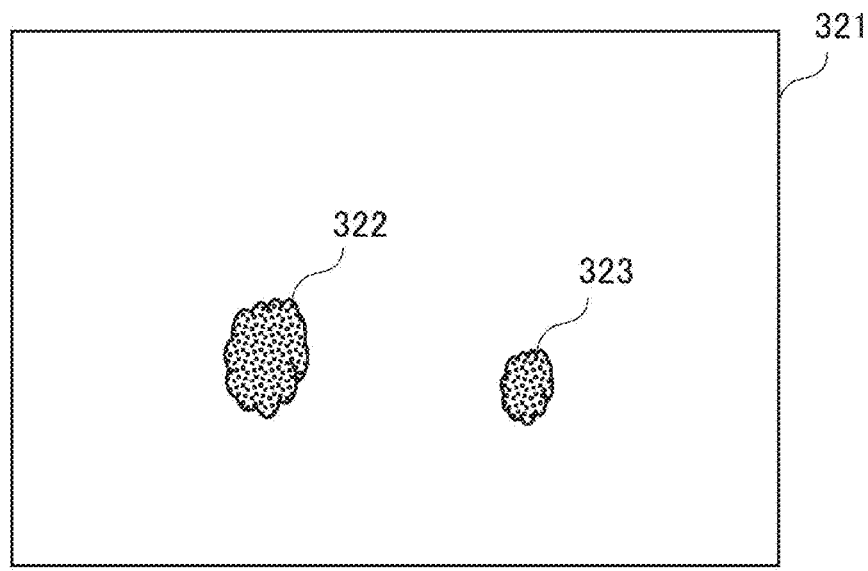
FIG. 12 is a diagram illustrating an image in which luminance values are saturated in a superimposed image.

FIG. 12 illustrates images 322 and 323 in which luminance values are saturated in the superimposed image 321. That is, the luminance values (luminance values) of the pixels included in the images 322 and 323 are saturated. The saturation of the luminance value means, for example, that the luminance value is equal to or more than a threshold (second threshold) or becomes a maximum value. The control unit 94 fixes (clips) the luminance value of each pixel of the images 322 and 323 whose luminance value is saturated with a specific value. For the images 322 and 323, the clipped luminance values are used, and the average value of the luminance values is calculated using the luminance values of the original pixels for the other regions.

A saturated portion of the luminance in the image is generated mainly due to specular reflection of light. A pixel corresponding to specularly reflected light has a considerably large luminance value. Therefore, when calculating the average of the luminance values of the superimposed image, even if the luminance control of the first or second embodiment is performed, there is a possibility that a portion other than the saturation point becomes considerably dark in an image having many saturation points of specular reflection. To solve this problem, a luminance value exceeding a threshold is clipped (for example, a luminance value of a pixel having a luminance value larger than a certain value A is replaced with a value A). As a result, even in an image with many specular reflections, a portion other than the saturation point can be displayed brightly.

(Calculation Example 4 of Luminance Information)

A weight of each of RGB is changed to calculate a luminance value (pixel value) of a pixel of the superimposed image. That is, the normal light image (first image) includes luminance values of red (R), green (G), and blue (B) for each pixel. The pixel value (luminance value) of the normal light image is calculated for each pixel on the basis of the luminance values of R, G, and B and the weights of R, G, and B for each pixel as shown in formula (1). Then, the luminance value for each pixel and the luminance value for each pixel of the fluorescence image are combined to calculate the luminance value for each pixel of the superimposed image. After setting the weight of each color of RGB, the control unit 94 may calculate the luminance information by averaging the luminance values of all the pixels in the superimposed image as in the first embodiment. Alternatively, the luminance information may be calculated by combining at least one of Calculation examples 1, 2, 3, 5, and 6 with the Calculation example 4. Hereinafter, examples of setting the weight of each color of RGB will be described as (Example 1) to (Example 4) below.

(Example 1) The control unit 94 adjusts the coefficients DR, DG, and DB for R, G, and B in formula (1) for calculating the Y luminance (WLI_Y) described above. For example, since there are basically many red components in the body cavity observed by the endoscope, in order to enhance the sensitivity of red, the weight of DR may be made larger than that in the case of calculating Y luminance which is generally used. For example, the ratio of DR, DG, and DB is generally about 3:6:1, but the ratio of DR, DG, and DB may be 4.5:4.5:1. Specifically, the values of DR, DG, and DB may be 0.45, 0.45, and 0.1.

(Example 2) When a fluorescence image is generated, the color of the fluorescence image (that is, the color of the fluorescence to be displayed) can be changed. Since the fluorescence emitted from the observation target S itself does not have a specific color (human identifiable color), it is necessary to determine a color component of the fluorescence image when generating the fluorescence image. In general, G (green) is often used as the color component of fluorescence, but it is possible to designate another color such as B (blue) as the color of the fluorescence image. When superimposing the fluorescence image on the normal light image, the control unit 94 may change the weight of RGB according to the color of the fluorescence image.

For example, when the display color of fluorescence is G (green), the ratio of DR, DG, and DB is 3:6:1. When the display color of fluorescence is B (blue), the ratio of DR, DG, and DB is 3:4:3. By changing the weighting of RGB according to the display color of fluorescence in this manner, the following sensitivity to the brightness of fluorescence can be enhanced.

(Example 3) The control unit 94 may change the weight of RGB according to the emission color (background color) of the first light source 11 of the normal light. For example, when the emission of the normal light is white light, the ratio of DR, DG, and DB is 3:6:1, and when the emission of the normal light is purple, the ratio is 3:4:3. By changing the weight of RGB according to the emission color in this manner, it is possible to superimpose an image according to the spectral characteristics, and it is possible to enhance the visibility of the superimposed image.

(Example 4) The control unit 94 may change the weight of each color of RGB between the case of displaying the normal light image and the case of displaying the superimposed image in which the normal light image and the fluorescence image are superimposed. That is, the control unit 94 can execute a display mode (first display mode) in which the superimposed image is displayed and a display mode (second display mode) in which the normal light image is displayed. The control unit 94 may select a mode to be executed on the basis of instruction data input from the input unit 95 by a user such as a doctor. The control unit 94 changes the weights of R, G, and B according to which of the first display mode and the second display mode is executed. In the second display mode, the normal light image may be displayed without being superimposed on the fluorescence image, or the superimposed image may be displayed with α set to zero. When the second display mode of displaying the normal light image is executed, since the normal light image has a few or few green (G) signal components, the weight of the red (R) signal component is increased to calculate the average value of the luminance. For example, the ratio of DR, DG, and DB is 4.5:4.5:1.

When the first display mode for displaying the superimposed image is executed, the weight is changed according to the color of the fluorescence image. For example, in a case where the display color (color component) of the fluorescence is set to green (G), the sensitivity of G is required more than in the case of the normal light image. Therefore, the ratio of DR, DG, and DB is set to 3:6:1, which is the same as the ratio used normally. When the display color (color component) of the fluorescence is set to a color other than green, the ratio corresponding to the color is only required to be increased as described in (Example 2). For example, when the display color of the fluorescence is blue, the sensitivity of the blue can be increased by setting the ratio of DR, DG, and DB to 3:4:3.

(Calculation Example 5 of Luminance Information)

When the luminance information of the superimposed image is calculated, pixels are sampled from the superimposed image in a certain cycle in each of the vertical direction and the horizontal direction, and the luminance information is calculated using only the luminance values of the sampled pixels. The luminance information may be calculated by averaging luminance values of all sampled pixels, or may be calculated by combining at least one of other Calculation examples 1 to 4 and 6 with the Calculation example 5.

When all the pixels of the superimposed image are used, the processing load increases in proportion to the number of pixels, and the circuit size or the memory capacity also increases. Therefore, by thinning out the pixels to be processed, the processing load can be reduced, and the circuit size or the memory capacity can also be reduced. For example, in a case where the number of pixels of the superimposed image (or the number of pixels of the imaging unit 52) is a low number of pixels, all pixels are used in the vertical direction of the superimposed image (all pixels readout), and every other pixel is used in the horizontal direction of the superimposed image (½ pixel readout). In a case where the number of pixels of the superimposed image (or the number of pixels of the imaging unit 52) is medium, every other pixel is used in the vertical direction (½ pixel readout), and every three pixels are used in the horizontal direction (¼ pixel readout). In a case where the number of pixels of the superimposed image (or the number of pixels of the imaging unit 52) is a high number of pixels, every three pixels in the vertical direction (¼ pixel readout) and every seven pixels in the horizontal direction (⅛ pixel readout) are used.

(Calculation Example 6 of Luminance Information)

Which region of the observation target displayed on the display device 70 the user (observer) such as a doctor observes differs depending on a purpose, a situation, a procedure used by the doctor, or the like. The region observed by the user is, for example, the center of the screen or the edge of the screen. When halation occurs in the observed region, observation becomes difficult. In the Calculation example 6, the weight for the region with high luminance is increased and the luminance information is calculated, so that halation does not occur in an arbitrary region in the screen.

Figure 13:
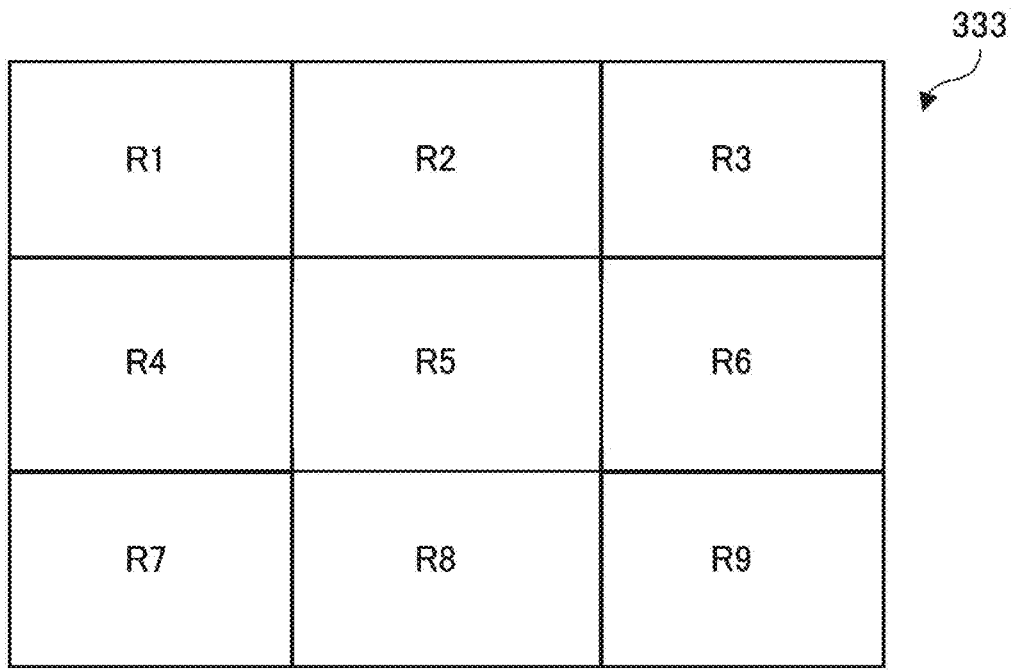
FIG. 13 is a diagram illustrating an example of calculating luminance information by increasing a weight for a region with high luminance.

FIG. 13 is a diagram illustrating an example of calculating luminance information by increasing a weight for a region with high luminance. The control unit 94 divides the superimposed image into a plurality of regions. In the example of FIG. 13, the superimposed image 333 is divided into a total of nine regions including a central region R5 and eight surrounding regions R1 to R4 and R6 to R9. The control unit 94 calculates an average (average luminance value) of the luminance values for each of the nine regions. A higher weight is set for each region in descending order of the average luminance value. That is, a higher weight is set for a region having a higher average luminance value. The average luminance value of each region is multiplied by a weight to calculate a weighted average. The weighted average may be calculated by multiplying the luminance value of the pixel in each region by the weight of the region and calculating the weighted average for all the pixels in all the regions. The calculated weighted average is used as luminance information of the superimposition region. By performing luminance control using this luminance information, control parameters (first control parameter and second control parameter) for normal light and fluorescence are adjusted according to a region with high luminance or a region where halation occurs. Therefore, luminance saturation of an area observed by a user such as a doctor can be prevented. In the example of FIG. 13, the superimposed image is divided into 9 regions, but the number of divisions may be any number as long as it is 2 or more. The sizes of the divided regions may be the same or different.

Although some embodiments of the present disclosure have been described, these embodiments have been presented as examples and are not intended to limit the scope of the disclosure, and these embodiments can be implemented in various other embodiments and various omissions, substitutions, and changes can be made without departing from the gist of the disclosure. These embodiments and modifications thereof are included in the scope and gist of the disclosure and are included in the disclosure described in the claims and the equivalent scope thereof. Furthermore, the effects of the present disclosure described in the present specification are merely examples, and other effects may be provided.

Note that the present disclosure can also have the following configurations.

(Item 1)

An image processing apparatus including:
a first light source that irradiates a subject with first light having a first wavelength band;
a first imaging unit that generates a first image signal by exposing light reflected from the subject to the first light;
a first image processing unit that performs first image processing on the basis of the first image signal to generate a first image;
a second light source that irradiates the subject with second light having a second wavelength band different from the first wavelength band and including an excitation wavelength of a fluorescent substance contained in the subject;
a second imaging unit that generates a second image signal by exposing fluorescence generated from the subject to the second light;
a second image processing unit that performs second image processing on the basis of the second image signal to generate a second image;
a superimposed image generation unit that generates a superimposed image by superimposing the first image and the second image; and
a control unit that adjusts luminance of the first image and luminance of the second image by adjusting a first control parameter for controlling at least one of the first light source, the first imaging unit, or the first image processing unit and a second control parameter for controlling at least one of the second light source, the second imaging unit, or the second image processing unit on the basis of luminance information of the superimposed image.

(Item 2)

The image processing apparatus according to item 1, in which
the control unit adjusts the first control parameter and the second control parameter on the basis of a difference between luminance information of the superimposed image and target luminance information of the superimposed image.

(Item 3)

The image processing apparatus according to item 2, in which
the control unit adjusts the first control parameter and the second control parameter to make the difference zero or less than or equal to a threshold.

(Item 4)

The image processing apparatus according to any one of items 1 to 3, in which
the control unit adjusts the first control parameter and the second control parameter on the basis of a condition regarding a ratio of a ratio between the first control parameter and the second control parameter.

(Item 5)

The image processing apparatus according to item 4, in which
the control unit sets a difference between a ratio of the first control parameter and the second control parameter before adjustment and a ratio of the first control parameter and the second control parameter after adjustment to zero or less than or equal to a threshold.

(Item 6)

The image processing apparatus according to any one of items 1 to 5, in which
the first control parameter is a parameter for adjusting the light amount of the first light source, and
the second control parameter is a parameter for adjusting the light amount of the second light source.

(Item 7)

The image processing apparatus according to any one of items 1 to 6, in which
the first control parameter is a parameter for adjusting an exposure amount of reflected light of the first light in the first imaging unit, and
the second control parameter is a parameter for adjusting an exposure amount of the fluorescence in the second imaging unit.

(Item 8)

The image processing apparatus according to any one of items 1 to 7, in which
the first control parameter is a parameter for adjusting an analog gain of the first image signal in the first imaging unit, and
the second control parameter is a parameter for adjusting an analog gain of the second image signal in the second imaging unit.

(Item 9)

The image processing apparatus according to any one of items 1 to 8, in which
the first control parameter is a parameter for adjusting a digital gain of the first image signal in the first image processing unit, and
the second control parameter is a parameter for adjusting a digital gain of the second image signal in the second image processing unit.

(Item 10)

The image processing apparatus according to any one of items 1 to 9, in which
the first control parameter includes at least two of a first light amount adjustment parameter for adjusting a light amount of the first light source, a first exposure amount adjustment parameter for adjusting an exposure amount of reflected light of the first light in the first imaging unit, a first analog gain adjustment parameter for adjusting an analog gain of a first image signal in the first imaging unit, and a first digital gain adjustment parameter for adjusting a digital gain of the first image signal in the first image processing unit,
the second control parameter includes at least two of a second light amount adjustment parameter for adjusting the light amount of the second light source, a second exposure amount adjustment parameter for adjusting the exposure amount of the fluorescence in the second imaging unit, a second analog gain adjustment parameter for adjusting an analog gain of the second image signal in the second imaging unit, and a second digital gain adjustment parameter for adjusting a digital gain of the second image signal in the second image processing unit, the control unit adjusts at least two of the first light amount adjustment parameter, the first exposure amount adjustment parameter, the first analog gain adjustment parameter, and the first digital gain adjustment parameter in a first priority order, and the control unit adjusts at least two of the second light amount adjustment parameter, the second exposure amount adjustment parameter, the second analog gain adjustment parameter, and the second digital gain adjustment parameter in a second priority order.

(Item 11)

The image processing apparatus according to item 10, in which the first priority order is an order of the first light amount adjustment parameter and the first exposure amount adjustment parameter, and the second priority order is the order of the second light amount adjustment parameter and the second exposure amount adjustment parameter.

(Item 12)

The image processing apparatus according to item 10, in which the first priority order is an order of the first light amount adjustment parameter, the first analog gain adjustment parameter, the first digital gain adjustment parameter, and the first exposure amount adjustment parameter, and the second priority order is the order of the second light amount adjustment parameter, the second analog gain adjustment parameter, the second digital gain adjustment parameter, and the second exposure amount adjustment parameter.

(Item 13)

The image processing apparatus according to any one of items 1 to 12, in which the luminance information of the superimposed image is average luminance of the superimposed image.

(Item 14)

The image processing apparatus according to item 13, in which the superimposed image includes a first image portion including a first position of the superimposed image and a second image portion around the first image portion, and the control unit sets a first weight to the first image portion and a second weight to the second image portion, and calculates a weighted average of luminance of the first image portion and luminance of the second image portion on the basis of the first weight and the second weight.

(Item 15)

The image processing apparatus according to item 13 or 14, in which the control unit calculates the average luminance only on the basis of image portion having luminance equal to or higher than a first threshold in the superimposed image.

(Item 16)

The image processing apparatus according to any one of items 13 to 15, in which the control unit fixes luminance of a pixel having luminance of a second threshold or more in the superimposed image to the second threshold and calculates the average luminance.

(Item 17)

The image processing apparatus according to any one of items 1 to 16, in which the first image includes luminance values of red, green, and blue for each pixel, the superimposed image generation unit calculates a luminance value for each pixel of the first image on the basis of the luminance values of red, green, and blue for each pixel of the first image and weights of red, green, and blue, synthesizes a luminance value for each pixel of the first image and a luminance value for each pixel of the second image, and calculates a luminance value for each pixel of the superimposed image, and the control unit changes weights of the red, the green, and the blue according to a color of the second image.

(Item 18)

The image processing apparatus according to any one of items 1 to 17, in which the first image includes luminance values of red, green, and blue for each pixel, the superimposed image generation unit calculates a luminance value for each pixel of the first image on the basis of the luminance values of red, green, and blue for each pixel of the first image and weights of red, green, and blue, synthesizes a luminance value for each pixel of the first image and a luminance value for each pixel of the second image, and calculates a luminance value for each pixel of the superimposed image, and the control unit changes weights of the red, the green, and the blue according to a color of the first image.

(Item 19)

The image processing apparatus according to any one of items 1 to 18, in which the control unit selectively executes a first display mode in which the superimposed image is displayed and a second display mode in which the first image is displayed, the first image includes luminance values of red, green, and blue for each pixel, the superimposed image generation unit calculates a luminance value for each pixel of the first image on the basis of the luminance values of red, green, and blue for each pixel of the first image and weights of red, green, and blue, synthesizes a luminance value for each pixel of the first image and a luminance value for each pixel of the second image, and calculates a luminance value for each pixel of the superimposed image, and the control unit changes weights of the red, the green, and the blue depending on which of the first display mode and the second display mode is to be executed.

(Item 20)

The image processing apparatus according to any one of items 13 to 19, in which the control unit calculates an average luminance for each of a plurality of regions in the superimposed image and sets a higher weight for a pixel included in the region as the average luminance is higher, and calculates a weighted average of luminance for each pixel of the superimposed image on the basis of the weight of the pixel for each region.

(Item 21)

The image processing apparatus according to any one of items 1 to 20, in which the control unit simultaneously adjusts the first control parameter and the second control parameter.

(Item 22)

An image processing method including:
a first step of irradiating a subject with first light having a first wavelength band;
a second step of exposing light reflected from the subject to the first light to generate a first image signal;
a third step of performing first image processing on the basis of the first image signal to generate a first image;
a fourth step of irradiating the subject with second light having a second wavelength band different from the first wavelength band and including an excitation wavelength of a fluorescent substance contained in the subject;
a fifth step of exposing fluorescence generated from the subject to the second light to generate a second image signal;
a sixth step of performing second image processing on the basis of the second image signal to generate a second image;
a seventh step of generating a superimposed image by superimposing the first image and the second image; and
an eighth step of adjusting luminance of the first image and luminance of the second image by adjusting a first control parameter for controlling at least one of the first step, the second step, or the third step and a second control parameter for controlling at least one of the fourth step, the fifth step, or the sixth step on the basis of luminance information of the superimposed image.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

100 Endoscope device
10 Light source device
11 First light source
12 Second light source
20 Insertion member (endoscope main body)
21 Distal end portion
22 Connecting portion
23 Proximal end portion (eyepiece portion)
23 Proximal end portion
24A Emission portion
24B Incident portion
25 Observation optical system
25a to 25h Optical lens
27 Visual field mask
30 Light guide
31 One end
32 Other end
50 Camera head
51 Lens unit
52 Imaging unit
53 Communication unit
70 Display device
80 Transmission cable
90 Control device
91 Communication unit
92 Memory
93 Observation image generation unit
94 Control unit
95 Input unit
96 Output unit
97 Storage unit
210 Superimposed image
521 Excitation light cut filter
522 Imaging element
523 Signal processing unit
540 Gain adjustment unit (AGC circuit)
931 Memory controller
932 Normal light image processing unit
932 First image processing unit
933 Fluorescence image processing unit
933 Second image processing unit
934 Superimposed image generation unit
935 Display control unit
940, 940A, 940B Gain adjustment unit (AGC circuit)
941 Luminance information calculation unit
942 Parameter adjustment unit

The invention claimed is:

1. An image processing apparatus comprising:
a first light source configured to irradiate a subject with first light having a first wavelength band;
a first image sensor configured to generate a first image signal by exposing light reflected from the subject to the first light;
a first image processor configured to perform first image processing on a basis of the first image signal to generate a first image;
a second light source configured to irradiate the subject with second light having a second wavelength band different from the first wavelength band and including an excitation wavelength of a fluorescent substance contained in the subject;
a second image sensor configured to generate a second image signal by exposing fluorescence generated from the subject to the second light;
a second image processor configured to perform second image processing on a basis of the second image signal to generate a second image;
a superimposed image generation circuit configured to generate a superimposed image by superimposing the first image and the second image; and
a control circuit configured to adjust luminance of the first image and luminance of the second image by adjusting a first control parameter for controlling at least one of the first light source, the first image sensor, or the first image processor and a second control parameter for controlling at least one of the second light source, the second image sensor, or the second image processor on a basis of luminance information of the superimposed image, wherein adjusting includes at least one of
adjusting the first control parameter and the second control parameter based on a difference between luminance information of the superimposed image and target luminance information of the superimposed image to have a difference equal to or less than a threshold, and
adjusting the first control parameter and the second control parameter based on a ratio between the first control parameter and the second control parameter to have a difference between a ratio of the first control parameter and the second control parameter before adjustment and a ratio of the first control parameter and the second control parameter after adjustment equal to or less than a threshold.

2. The image processing apparatus according to claim 1, wherein the first control parameter is a parameter for adjusting the light amount of the first light source, and the second control parameter is a parameter for adjusting the light amount of the second light source.

3. The image processing apparatus according to claim 1, wherein the first control parameter is a parameter for adjusting an exposure amount of reflected light of the first light in the first image sensor, and the second control parameter is a parameter for adjusting an exposure amount of the fluorescence in the second image sensor.

4. The image processing apparatus according to claim 1, wherein the first control parameter is a parameter for adjusting an analog gain of the first image signal in the first image sensor, and the second control parameter is a parameter for adjusting an analog gain of the second image signal in the second image sensor.

5. The image processing apparatus according to claim 1, wherein the first control parameter is a parameter for adjusting a digital gain of the first image signal in the first image processor, and the second control parameter is a parameter for adjusting a digital gain of the second image signal in the second image processing unit processor.

6. The image processing apparatus according to claim 1, wherein the first control parameter includes at least two of a first light amount adjustment parameter for adjusting a light amount of the first light source, a first exposure amount adjustment parameter for adjusting an exposure amount of reflected light of the first light in the first image sensor, a first analog gain adjustment parameter for adjusting an analog gain of a first image signal in the first image sensor and a first digital gain adjustment parameter for adjusting a digital gain of the first image signal in the first image processor the second control parameter includes at least two of a second light amount adjustment parameter for adjusting the light amount of the second light source, a second exposure amount adjustment parameter for adjusting the exposure amount of the fluorescence in the second image sensor, a second analog gain adjustment parameter for adjusting an analog gain of the second image signal in the second image sensor, and a second digital gain adjustment parameter for adjusting a digital gain of the second image signal in the second image processor the control circuit is configured to adjust at least two of the first light amount adjustment parameter, the first exposure amount adjustment parameter, the first analog gain adjustment parameter, and the first digital gain adjustment parameter in a first priority order, and the control circuit is configured to adjust at least two of the second light amount adjustment parameter, the second exposure amount adjustment parameter, the second analog gain adjustment parameter, and the second digital gain adjustment parameter in a second priority order.

7. The image processing apparatus according to claim 6, wherein the first priority order is an order of the first light amount adjustment parameter and the first exposure amount adjustment parameter, and the second priority order is the order of the second light amount adjustment parameter and the second exposure amount adjustment parameter.

8. The image processing apparatus according to claim 6, wherein the first priority order is an order of the first light amount adjustment parameter, the first analog gain adjustment parameter, the first digital gain adjustment parameter, and the first exposure amount adjustment parameter, and the second priority order is the order of the second light amount adjustment parameter, the second analog gain adjustment parameter, the second digital gain adjustment parameter, and the second exposure amount adjustment parameter.

9. The image processing apparatus according to claim 1, wherein the luminance information of the superimposed image is average luminance of the superimposed image.

10. The image processing apparatus according to claim 9, wherein the superimposed image includes a first image portion including a first position of the superimposed image and a second image portion around the first image portion, and the control circuit is configured to set a first weight to the first image portion and a second weight to the second image portion, and calculates a weighted average of luminance of the first image portion and luminance of the second image portion on a basis of the first weight and the second weight.

11. The image processing apparatus according to claim 9, wherein the control circuit is configured to calculate the average luminance only on a basis of pixels having luminance equal to or higher than a first threshold in the superimposed image.

12. The image processing apparatus according to claim 9, wherein the control circuit is configured to fix luminance of a pixel having luminance of a second threshold or more in the superimposed image to the second threshold and calculate the average luminance.

13. The image processing apparatus according to claim 9, wherein the control circuit is configured to calculate an average luminance for each of a plurality of regions in the superimposed image and sets a higher weight for a pixel included in the region as the average luminance is higher, and calculate a weighted average of luminance for each pixel of the superimposed image on a basis of the weight of the pixel for each region.

14. The image processing apparatus according to claim 1, wherein the first image includes luminance values of red, green, and blue for each pixel, the superimposed image generation circuit is configured to calculate a luminance value for each pixel of the first image on a basis of the luminance values of red, green, and blue for each pixel of the first image and weights of red, green, and blue, synthesize a luminance value for each pixel of the first image and a luminance value for each pixel of the second image, and calculate a luminance value for each pixel of the superimposed image, and the control circuit is configured to change weights of the red, the green, and the blue according to a color of the second image.

15. The image processing apparatus according to claim 1, wherein the first image includes luminance values of red, green, and blue for each pixel, the superimposed image generation circuit is configured to calculate a luminance value for each pixel of the first image on a basis of the luminance values of red, green, and blue for each pixel of the first image and weights of red, green, and blue, synthesize a luminance value for each pixel of the first image and a luminance value for each pixel of the second image, and calculate a luminance value for each pixel of the superimposed image, and the control circuit is configured to change weights of the red, the green, and the blue according to a color of the first image.

16. The image processing apparatus according to claim 1, wherein the control circuit is configured to selectively execute a first display mode in which the superimposed image is displayed and a second display mode in which the first image is displayed, the first image includes luminance values of red, green, and blue for each pixel, the superimposed image generation circuit is configured to calculate a luminance value for each pixel of the first image on a basis of the luminance values of red, green, and blue for each pixel of the first image and weights of red, green, and blue, synthesize a luminance value for each pixel of the first image and a luminance value for each pixel of the second image, and calculate a luminance value for each pixel of the superimposed image, and the control circuit is configured to change weights of the red, the green, and the blue depending on which of the first display mode and the second display mode is to be executed.

17. The image processing apparatus according to claim 1, wherein the control is configured to simultaneously adjust the first control parameter and the second control parameter.

18. The image processing apparatus according to claim 1, wherein the circuitry is configured to perform adjusting based on both the difference between luminance information and the difference between ratios.

19. An image processing method comprising:

irradiating a subject with first light having a first wavelength band;

exposing light reflected from the subject to the first light to generate a first image signal;

performing first image processing on a basis of the first image signal to generate a first image;

irradiating the subject with second light having a second wavelength band different from the first wavelength band and including an excitation wavelength of a fluorescent substance contained in the subject;

exposing fluorescence generated from the subject to the second light to generate a second image signal;

performing second image processing on a basis of the second image signal to generate a second image;

generating a superimposed image by superimposing the first image and the second image; and adjusting luminance of the first image and luminance of the second image by adjusting a first control parameter for controlling at least one of irradiating, exposing, or performing for generating the first image, and a second control parameter for controlling irradiating, exposing, or performing for generating the second image on a basis of luminance information of the superimposed image, wherein adjusting includes at least one of adjusting the first control parameter and the second control parameter based on a difference between luminance information of the superimposed image and target luminance information of the superimposed image to have a difference equal to or less than a threshold, and adjusting the first control parameter and the second control parameter based on a ratio between the first control parameter and the second control parameter to have a difference between a ratio of the first control parameter and the second control parameter before adjustment and a ratio of the first control parameter and the second control parameter after adjustment equal to or less than a threshold.

20. The image processing method according to claim 19, wherein the circuitry is configured to perform adjusting based on both the difference between luminance information and the difference between ratios.

21. An image processor for an image processing apparatus including a first light source configured to irradiate a subject with first light having a first wavelength band, a first image sensor configured to generate a first image signal by exposing light reflected from the subject to the first light, a second light source configured to irradiate the subject with second light having a second wavelength band different from the first wavelength band and including an excitation wavelength of a fluorescent substance contained in the subject, and a second image sensor configured to generate a second image signal by exposing fluorescence generated from the subject to the second light, wherein the image processor includes circuitry configured to:

perform first image processing on a basis of the first image signal to generate a first image;

perform second image processing on a basis of the second image signal to generate a second image;

generate a superimposed image by superimposing the first image and the second image;

adjust luminance of the first image and luminance of the second image by adjusting a first control parameter for controlling at least one of the first light source, the first image sensor, or the first image processor and a second control parameter for controlling at least one of the second light source, the second image sensor, or the second image processor on a basis of luminance information of the superimposed image, wherein adjusting includes at least one of adjusting the first control parameter and the second control parameter based on a difference between luminance information of the superimposed image and target luminance information of the superimposed image to have the difference be equal to or less than a threshold, and adjusting the first control parameter and the second control parameter based on a ratio between the first control parameter and the second control parameter to have a difference between a ratio of the first control parameter and the second control parameter before adjustment and a ratio of the first control parameter and the second control parameter after adjustment equal to or less than a threshold.

22. The image processor according to claim 21, wherein the circuitry is configured to perform adjusting based on both the difference between luminance information and the difference between ratios.

\* \* \* \* \*